US012616163B2

(12) United States Patent
Tang

(10) Patent No.: US 12,616,163 B2
(45) Date of Patent: \*May 5, 2026

(54) PET TOILET

(71) Applicant: PETPIVOT INC, Portland, OR (US)

(72) Inventor: Xiaoxiang Tang, Guangdong (CN)

(73) Assignee: PETPIVOT INC, Portland, OR (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/541,428

(22) Filed: Dec. 15, 2023

(65) Prior Publication Data

US 2025/0169463 A1      May 29, 2025

(30) Foreign Application Priority Data

Nov. 24, 2023    (CN) .......................... 202323196077.4

(51) Int. Cl.
*A01K 1/01*              (2006.01)
(52) U.S. Cl.
CPC ............ *A01K 1/0114* (2013.01); *A01K 1/011* (2013.01)
(58) Field of Classification Search
CPC .... A01K 1/0107; A01K 1/0114; A01K 1/011; B07B 1/42; B07B 1/00
See application file for complete search history.

(56) References Cited

U.S. PATENT DOCUMENTS 11,963,512 B1 * 4/2024 Tang .................... A01K 1/0114
2020/0060221 A1 * 2/2020 Fan ...................... A01K 1/0114

2022/0104452 A1 * 4/2022 Gong ................... A01K 1/0114
2023/0000051 A1 * 1/2023 Nicholls .............. A01K 1/0114
2024/0397904 A1 * 12/2024 Cai ...................... A01K 1/0114
2025/0072384 A1 * 3/2025 Duan ................... A01K 1/0114

FOREIGN PATENT DOCUMENTS

| CN | 112438208 | A | * | 3/2021 | |
|----|-----------|---|---|--------|--|
| CN | 216254547 | U | * | 4/2022 | |
| CN | 114617067 | A | * | 6/2022 | |
| CN | 114667939 | A | * | 6/2022 | |
| CN | 114793917 | A | * | 7/2022 | |
| CN | 115316288 | A | * | 11/2022 | |
| CN | 115623990 | A | * | 1/2023 | |
| CN | 218736473 | U | * | 3/2023 | |
| CN | 114599225 | B | * | 9/2023 | ............ A01K 1/011 |

* cited by examiner

*Primary Examiner* — Peter M Poon
*Assistant Examiner* — Shada Mohamed Alghailani

(57)                        ABSTRACT

The present disclosure provides a pet toilet, wherein: when the roller rotates from the original position toward the defecation position, the pet sand can enter the third accommodation space through the sieve component, the excrement is limited out of the third accommodation space; the sealing door opens the second opening, the first opening rotates along with the roller to be aligned with the second opening, such that the excrement can be discharged by its own gravity into the second accommodation space through the first opening and the second opening; when the excrement is discharged into the second accommodation space of the fecal collection box, and the roller rotates from the defecation position toward the original position, the pet sand in the third accommodation can pass through the sieve component and falling back into the first accommodation space by its own gravity, and the sealing door closes the second opening.

14 Claims, 29 Drawing Sheets

PET TOILET

CROSS-REFERENCE TO RELATED APPLICATIONS

The application claims priority of Chinese patent application CN2023231960774, filed on Nov. 24, 2023, which is incorporated herein by reference in its entireties.

TECHNICAL FIELD

The present disclosure relates to the field of pet products, in particular to a pet toilet.

BACKGROUND ART

Current pet toilets are mostly in ordinary containers, such as cat litter boxes. Cat litter boxes contain cat litter for pets to enter and defecate. However, after defecation, pet owners need to clean up the excrement, which is not only time-consuming and laborious, but also difficult for pet owners to accept the odor. Therefore, there is an urgent need to provide an intelligent cat litter box on the market, so as to achieve automatically clean feces and improve users' experience.

SUMMARY

In order to overcome the shortcomings in the prior art, the present disclosure provides a pet toilet comprising:

a roller, wherein the roller has a first opening and a first accommodation space, the first opening is in communication with the first accommodation space, and the first accommodation space is configured to accommodate excrement of pets and pet sand;

a base, wherein the base is configured to support the roller;

a fecal collection box, wherein the fecal collection box is provided under the base, the fecal collection box has a second accommodation space and a second opening, the second opening is in communication with the second accommodation space;

a sealing door, wherein the sealing door is provided at the second opening;

a sieve component, wherein the sieve component is connected to the roller, and the sieve component and an inner wall of the roller surround to form a third accommodation space, the third accommodation space is ambient to the first accommodation space, and the sieve component is configured to sieve the pet sand and the excrement;

a drive device, wherein the drive device is configured to drive the roller to rotate on the base; when the first opening rotates along with the roller from an original position toward a defecation position, the pet sand is capable of entering the third accommodation space through the sieve component, the excrement is limited out of the third accommodation space, and the sealing door opens the second opening, the first opening rotates along with the roller to be aligned with the second opening, such that the excrement is capable of being discharged by its own gravity into the second accommodation space through the first opening and the second opening; when the first opening rotates along with the roller from the defecation position toward the original position, the pet sand in the third accommodation is capable of passing through the sieve component and falling back into the first accommodation space by its own gravity, and the scaling door closes the second opening.

As improvement of the present disclosure, when the first opening rotates along with the roller from the original position toward the defecation position, the pet sand is capable of entering the third accommodation space through the sieve component, the excrement is limited out of the third accommodation space, the drive device drives the sealing door to open the second opening, the first opening rotates along with the roller to be aligned with the second opening, such that the excrement is capable of being discharged by its own gravity into the second accommodation space through the first opening and the second opening; when the first opening rotates along with the roller from the defecation position toward the original position, the pet sand in the third accommodation is capable of passing through the sieve component and falling back into the first accommodation space by its own gravity, and the drive device drives the sealing door to close the second opening.

As improvement of the present disclosure, the drive device comprises a drive assembly and a transmission assembly, wherein the drive device is configured to drive the roller to rotate on the base; when the first opening rotates along with the roller from the original position toward the defecation position, the roller, through the transmission device, drives the scaling door to open the second opening, the first opening rotates along with the roller to be aligned with the second opening, such that the excrement is capable of being discharged by its own gravity into the second accommodation space through the first opening and the second opening; when the first opening rotates along with the roller from the defecation position toward the original position, the pet sand in the third accommodation is capable of passing through the sieve component and falling back into the first accommodation space by its own gravity, and the roller, through the transmission device, drives the sealing door to close the second opening.

As improvement of the present disclosure, the transmission assembly comprises a first transmission element and a second transmission element, the first transmission element is provided on an outer side wall of the roller, the second transmission element is provided on the scaling door; when the first opening rotates along with the roller from the original position toward the defecation position, the first transmission element is connected in transmission with the second transmission element, the roller, by rotation, drives the first transmission element to rotate, the first transmission element rotates to drive the second transmission element to move, such that the scaling door moves along with the second transmission element until opening the second opening, and the first opening rotates along with the roller to be aligned with the second opening, such that the excrement is capable of being discharged by its own gravity into the second accommodation space through the first opening and the second opening; when the first opening rotates along with the roller from the defecation position toward the original position, the first transmission element is connected in transmission with the second transmission element, the pet sand in the third accommodation is capable of passing through the sieve component and falling back into the first accommodation space by its own gravity, and the first transmission element rotates to drive the second transmission element to move, such that the sealing door moves along with the second transmission element until closing the second opening.

As improvement of the present disclosure, the fecal collection box is provided thereon with a sliding rail, the roller, by rotation, drives the first transmission element to rotate, the first transmission element rotates to drive the second transmission element to move, such that the sealing door slides along with the second transmission element on the sliding rail until opening or closing the second opening.

As improvement of the present disclosure, the first transmission element is an first rack of an arc shape arranged along an outer circumferential wall of the roller, the scaling door is a sealing door of a plat and straight shape, the second transmission element is a second rack of a plat and straight shape arranged on the sealing door, the sliding rail is a sliding rail of a plat and straight shape; the roller, by rotation, drives the first rack to rotate, such that the first rack drives the second rack to move, and the sealing door slides along with the second rack on the sliding rail until opening or closing the second opening.

As improvement of the present disclosure, the first transmission element is an first rack of an arc shape arranged along an outer circumferential wall of the roller, the scaling door is a sealing door of an arc shape, the second transmission element is a second rack of an arc arranged on the sealing door, the sliding rail is a sliding rail of an arc shape; the roller, by rotation, drives the first rack to rotate, such that the first rack drives the second rack to move, and the sealing door slides along with the second rack on the sliding rail until opening or closing the second opening.

As improvement of the present disclosure, the base is further provided thereon with a third opening, the third opening is located between the roller and the second opening; when the first opening rotates along with the roller from the original position toward the defecation position, the pet sand is capable of entering the third accommodation space through the sieve component, the excrement is limited out of the third accommodation space, and the sealing door opens the second opening, the first opening rotates along with the roller to be aligned with the third opening and the second opening, such that the excrement is capable of being discharged by its own gravity into the second accommodation space through the first opening and the second opening; when the first opening rotates along with the roller from the defecation position toward the original position, the first opening and the second opening are staggered with the third opening, the pet sand in the third accommodation is capable of passing through the sieve component and falling back into the first accommodation space by its own gravity, and the scaling door closes the second opening.

As improvement of the present disclosure, the drive assembly comprises a drive motor, a driving gear, and a driven gear; the drive motor has a drive shaft, the driving gear is sheathed on the drive shaft, the driven gear is arranged on the roller, and the driven gear meshes with the driving gear such that the drive shaft rotates to drive the driving gear to rotate, the driving gear rotates to drive the driven gear to rotate, and the driven gear rotates to drive the roller to rotate on the base.

As improvement of the present disclosure, one side of the base is provided with a first support arm, another side of the base is provided with a second support arm, each of the first support arm and the second support arm is provided with a support groove; both the two sides of the roller have support shafts, the support shafts are located in the support grooves, and each support groove is provided therein with a plurality of first wheels, the first wheels support the support shafts.

As improvement of the present disclosure, the base further has a recessed portion recessing toward a direction away from the roller; when the roller is supported on the base, there is a gap between the roller and an inner wall of the recessed portion, and the recessed portion is provided thereon with a second wheel.

As improvement of the present disclosure, the third opening is arranged in the recessed portion.

As improvement of the present disclosure, below the support groove there is further provided with a mounting groove, the mounting groove is in communication with the support groove, the driving gear is arranged in the mounting groove, an inner wall of the mounting groove is provided with a fourth opening, and the mounting groove is in communication with the outside through the fourth opening.

As improvement of the present disclosure, the fecal collection box is further provided thereon with a first avoidance groove, the first avoidance groove is configured to avoid the first rack and the second rack.

As improvement of the present disclosure, the fecal collection box has a first outer side wall and a first bottom wall, the first bottom wall is connected with the first outer side wall, when a distance between one side of the first bottom wall and a bottom end of the first outer side wall is defined as a first distance, and a distance between another side of the first bottom wall and the bottom end of the first outer side wall is defined as a second distance, the first distance is different from the second distance such that the first bottom wall is arranged by an inclined angle.

As improvement of the present disclosure, the base is provided thereon with a locking device, the locking device is configured to lock the fecal collection box detachably under the base.

As improvement of the present disclosure, the first accommodation space is provided therein with a plurality protruding frames.

As improvement of the present disclosure, a cushion body is further comprised, the cushion body detachably covers the frames and a bottom surface of the first accommodation space.

As improvement of the present disclosure, the cushion body is connected with an inner wall of the roller by buckle; the cushion body is provided thereon with a buckle part, the inner wall of the roller is provided with a buckle fitting part, the buckle part is detachably connected with the buckle fitting part.

As improvement of the present disclosure, the first accommodation space is provided therein with a protruding circular leak proof ring, the circular leak proof ring is configured to block the excrement of pets in the first accommodation space.

Advantageous effect of the present disclosure is that: the present disclosure provides a pet toilet, by the above structure, when the roller rotates from the original position toward the defecation position, the pet sand is capable of entering the third accommodation space through the sieve component, the excrement is limited out of the third accommodation space, thereby realizing sieving of pet sands and pet excrement; the sealing door opens the second opening, the first opening rotates along with the roller to be aligned with the second opening, such that the excrement is capable of being discharged by its own gravity into the second accommodation space through the first opening and the second opening, thereby completing separation and collection of the excrement; when the excrement is discharged into the second accommodation space of the fecal collection box, and the roller rotates from the defecation position toward the original position, the pet sand in the third accommodation is capable of passing through the sieve component and falling back into the first accommodation space by its own gravity, and the sealing door closes the second opening, so as to close the excrement in the fecal collection box and prevent odor of the excrement from emitting into residential environment.

BRIEF DESCRIPTION OF THE DRAWINGS

In order to explain technical solutions of embodiments of the present disclosure more clearly, drawings required to be used in description of the embodiments will be briefly introduced below. The drawings in the following description are only some embodiments of the present disclosure. For those skilled in the art, other drawings can be further obtained according to these drawings on the premise of paying no creative work.

The present disclosure is further explained below in accompany with the drawings and embodiments.

DETAILED DESCRIPTION OF THE EMBODIMENTS

Figure 1:
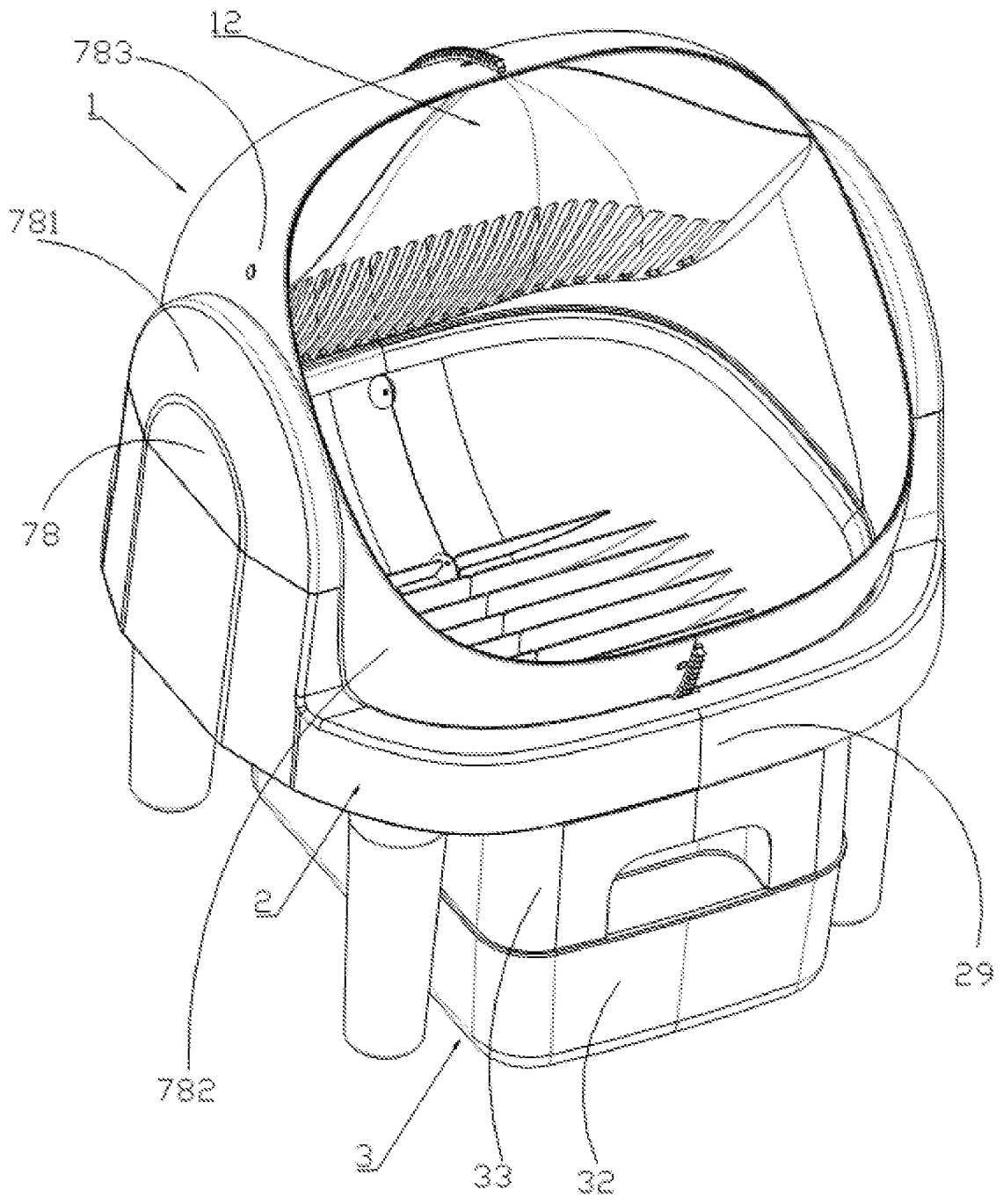
FIG. 1 is a whole structural schematic view of a roller of the present disclosure in an original position.
Figure 2:
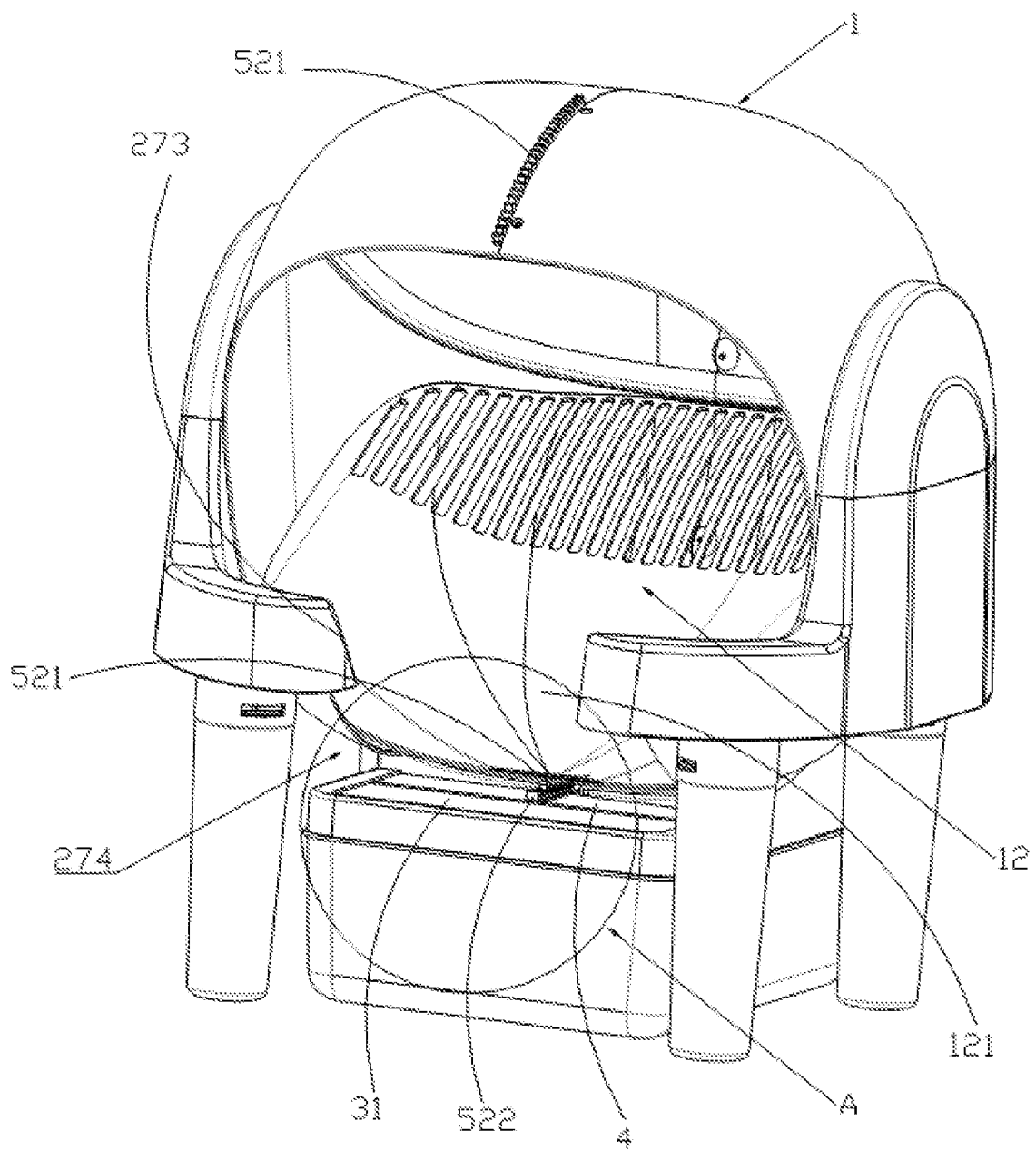
FIG. 2 is a whole structural schematic view of the roller of the present disclosure in a defecation position.
Figure 3:
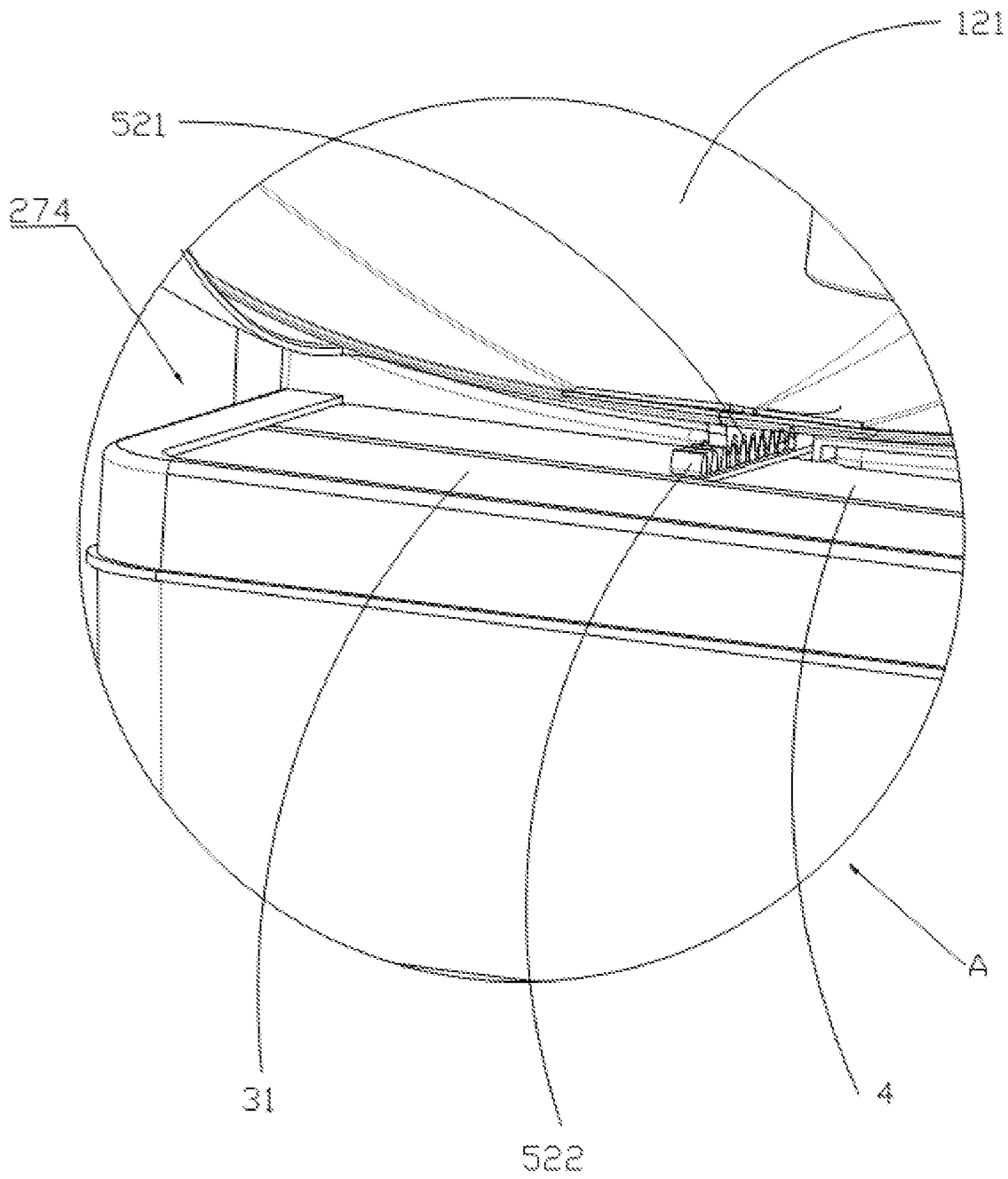
FIG. 3 is an enlarged view of the part A of FIG. 2.
Figure 4:
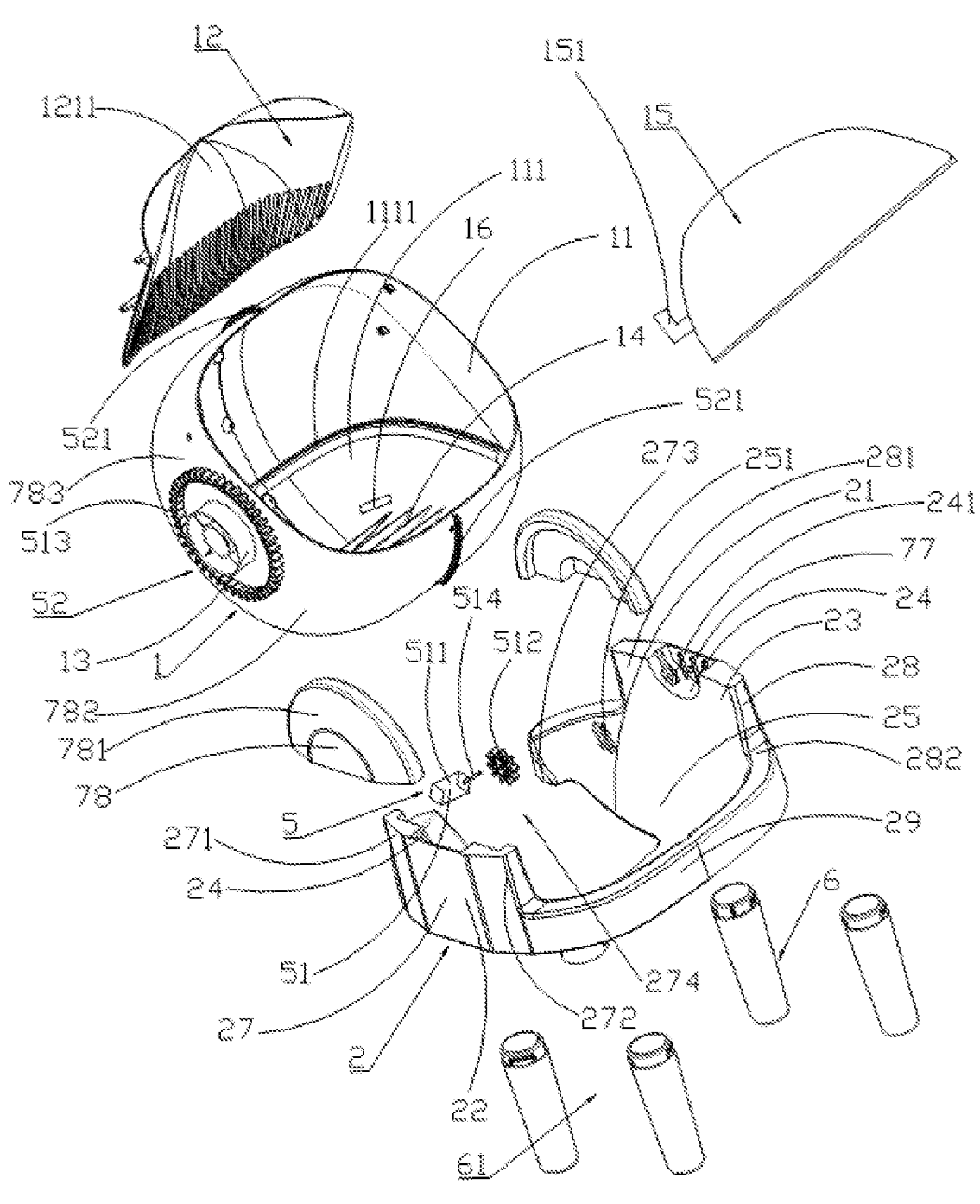
FIG. 4 is an exploded view of the roller and a base.
Figure 5:
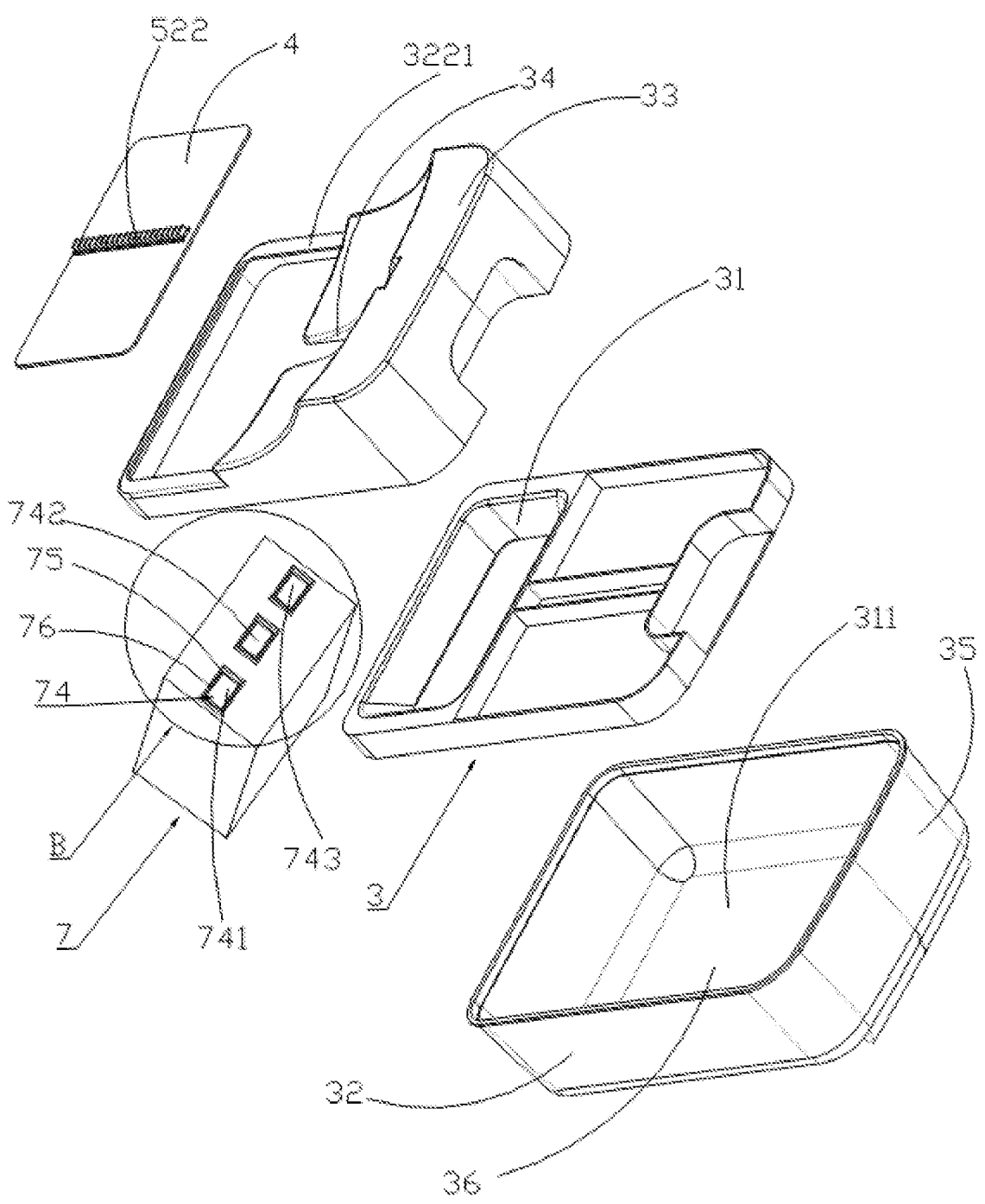
FIG. 5 is an exploded view of a fecal collection box.
Figure 6:
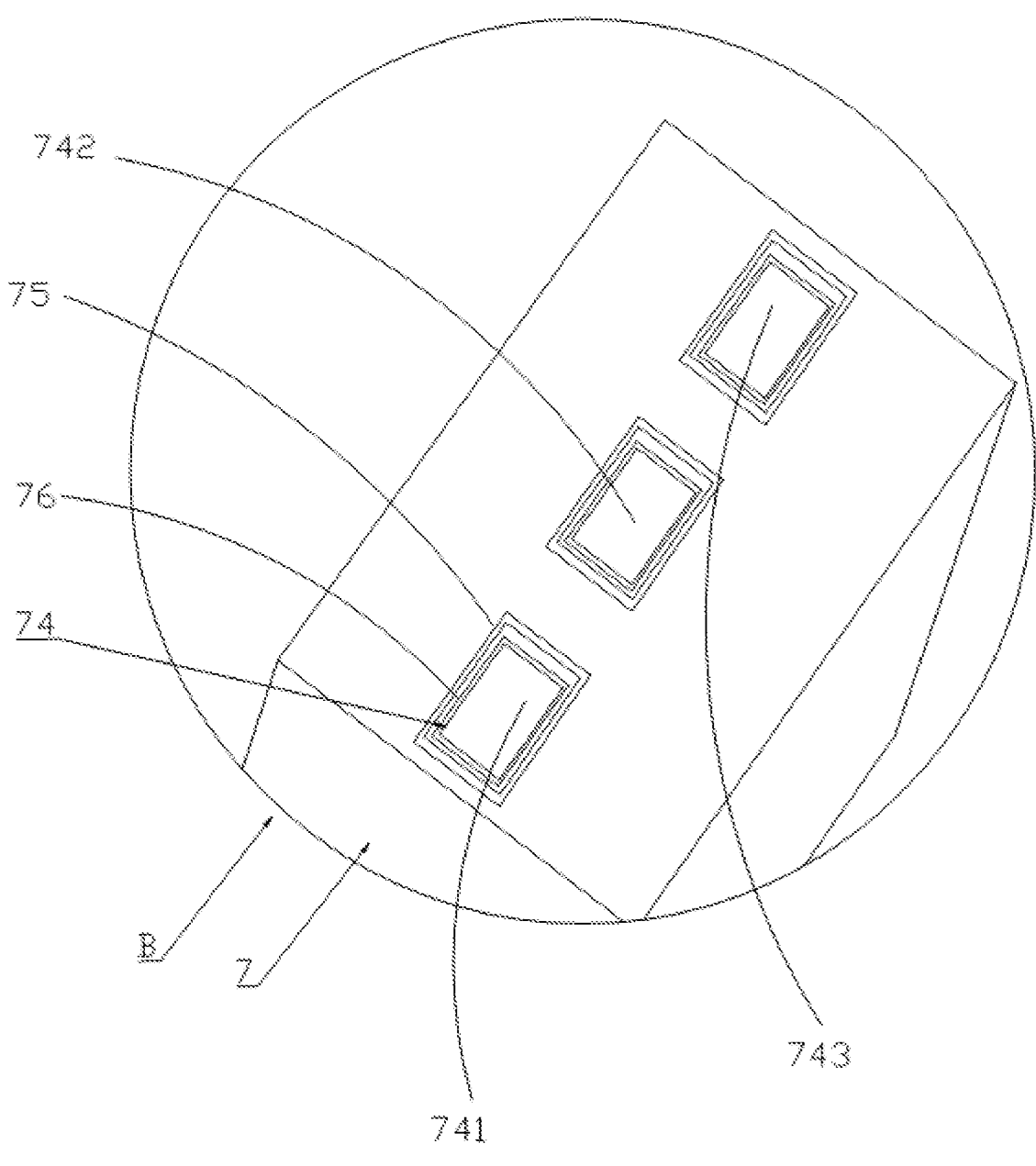
FIG. 6 is an enlarged view of the part B of FIG. 5.
Figure 7:
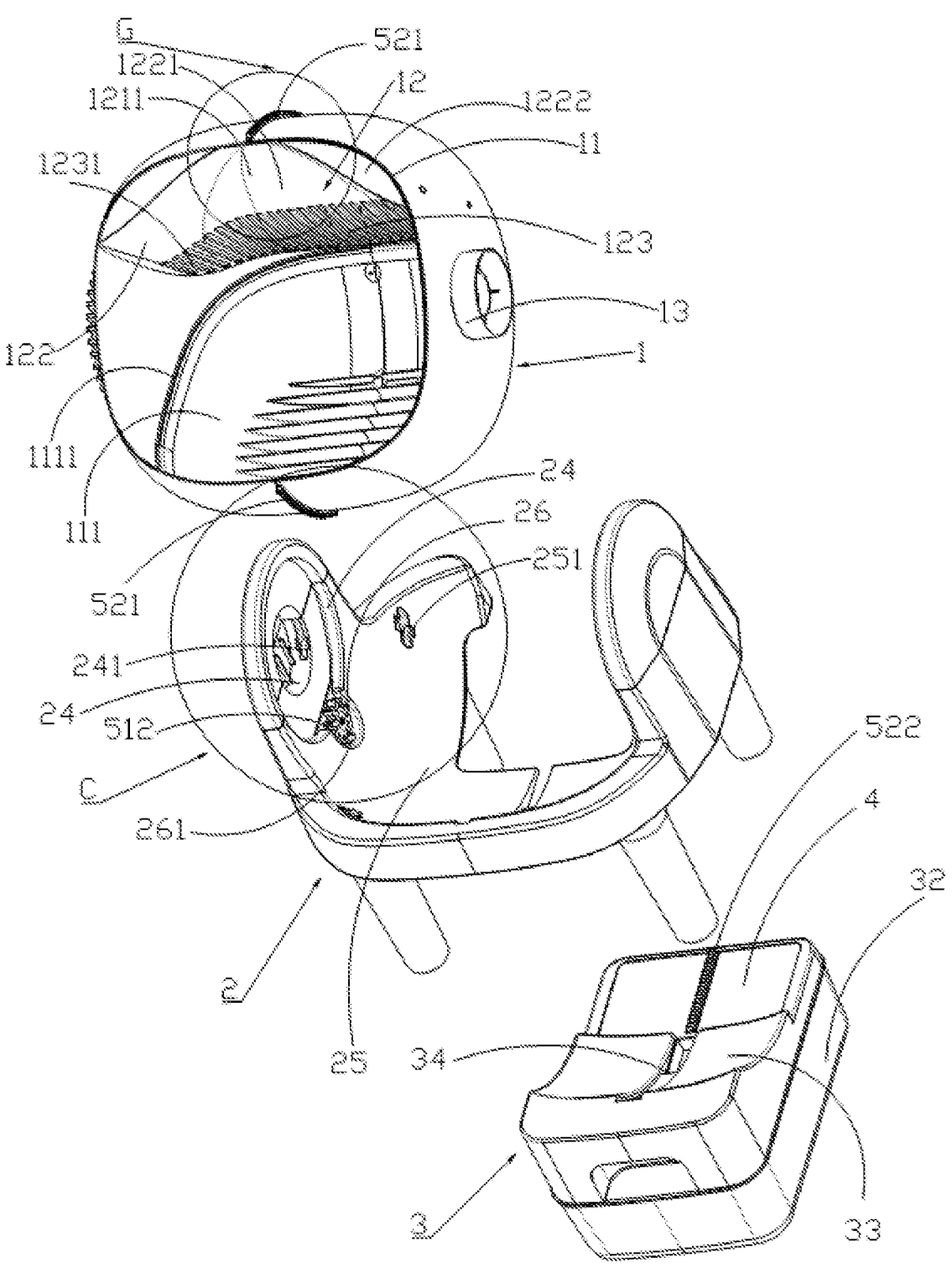
FIG. 7 is a whole structural schematic view of the present disclosure.
Figure 8:
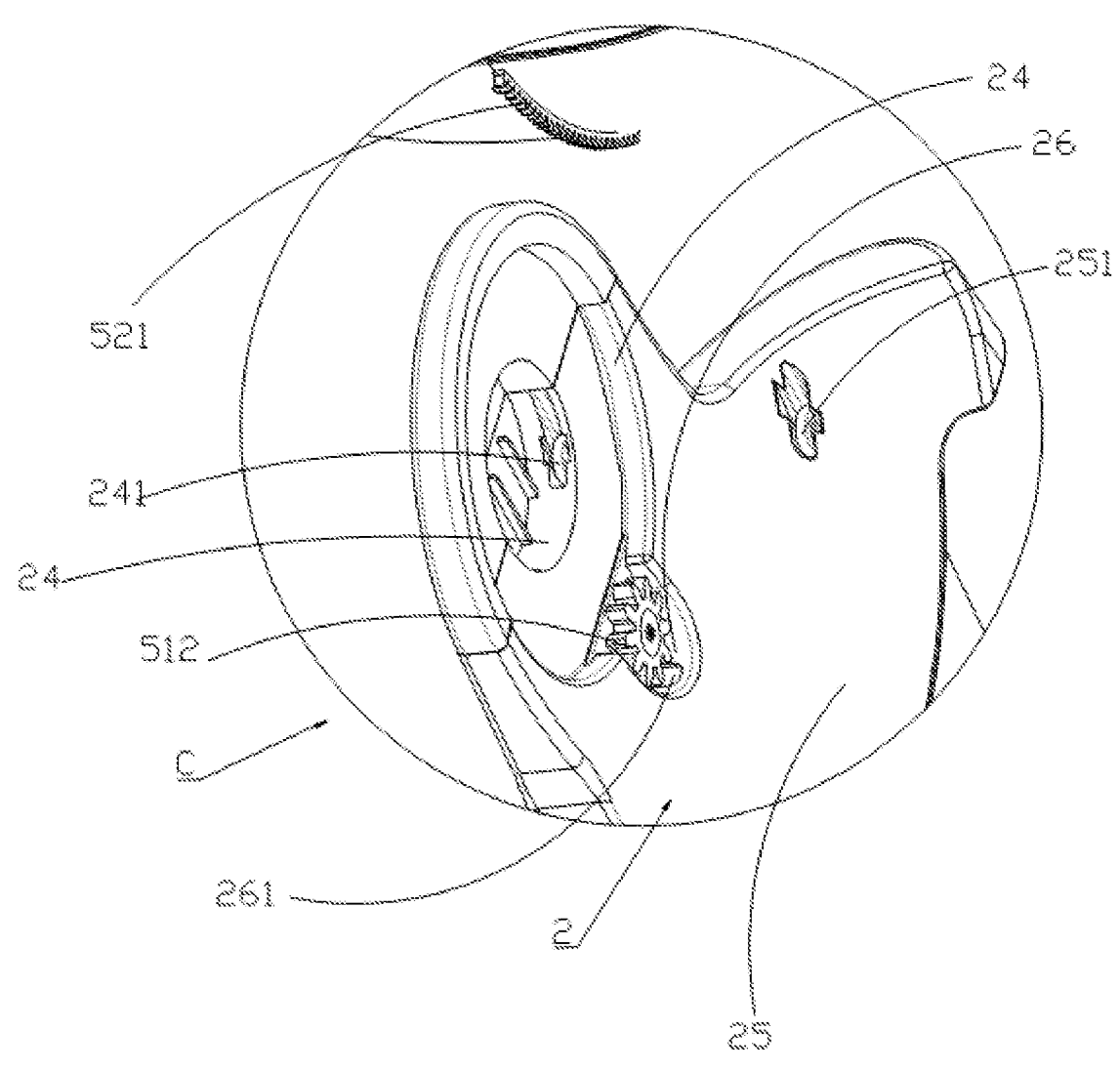
FIG. 8 is an enlarged view of the part C of FIG. 7.
Figure 9:
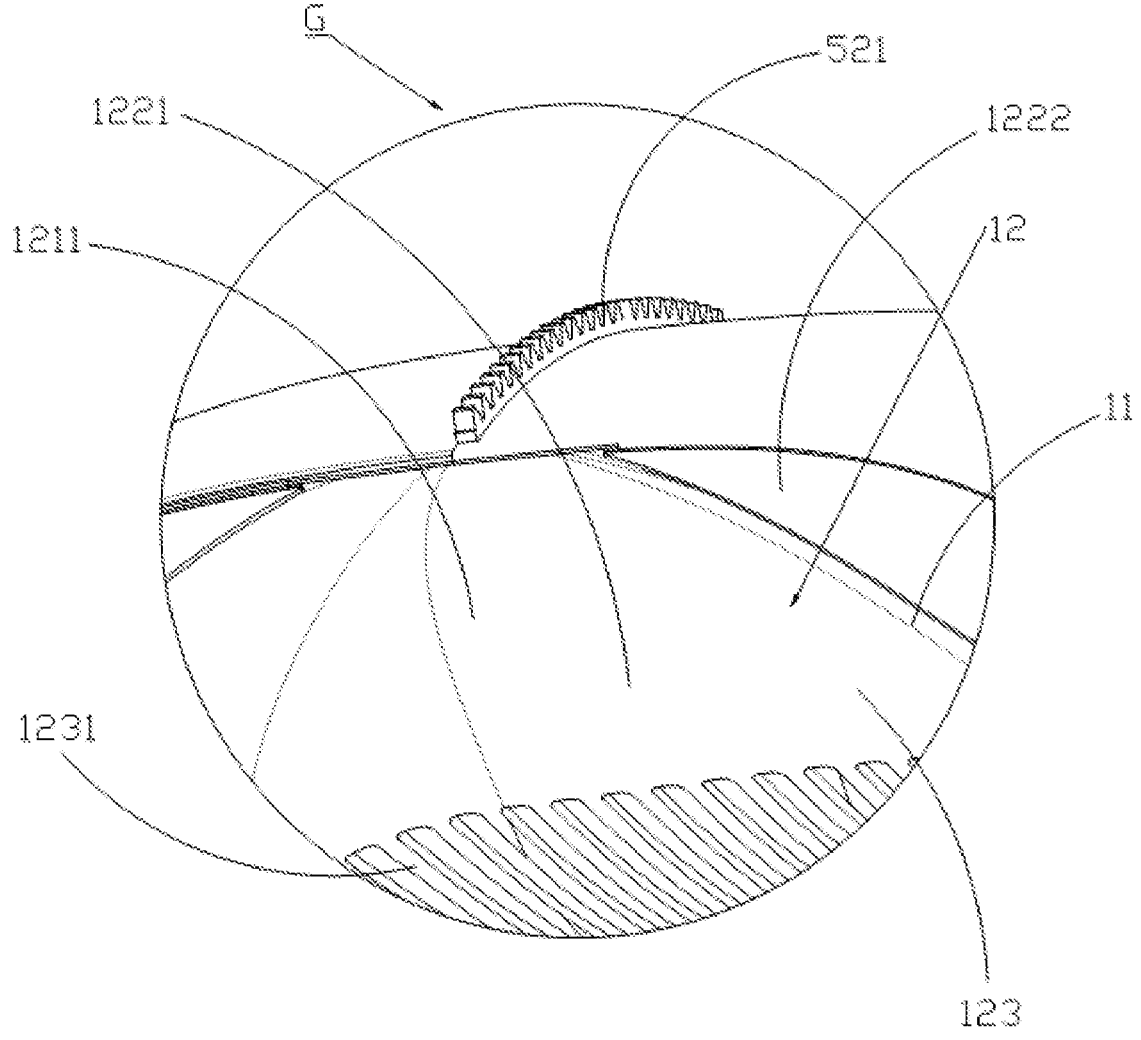
FIG. 9 is an enlarged view of the part G of FIG. 7.
Figure 10:
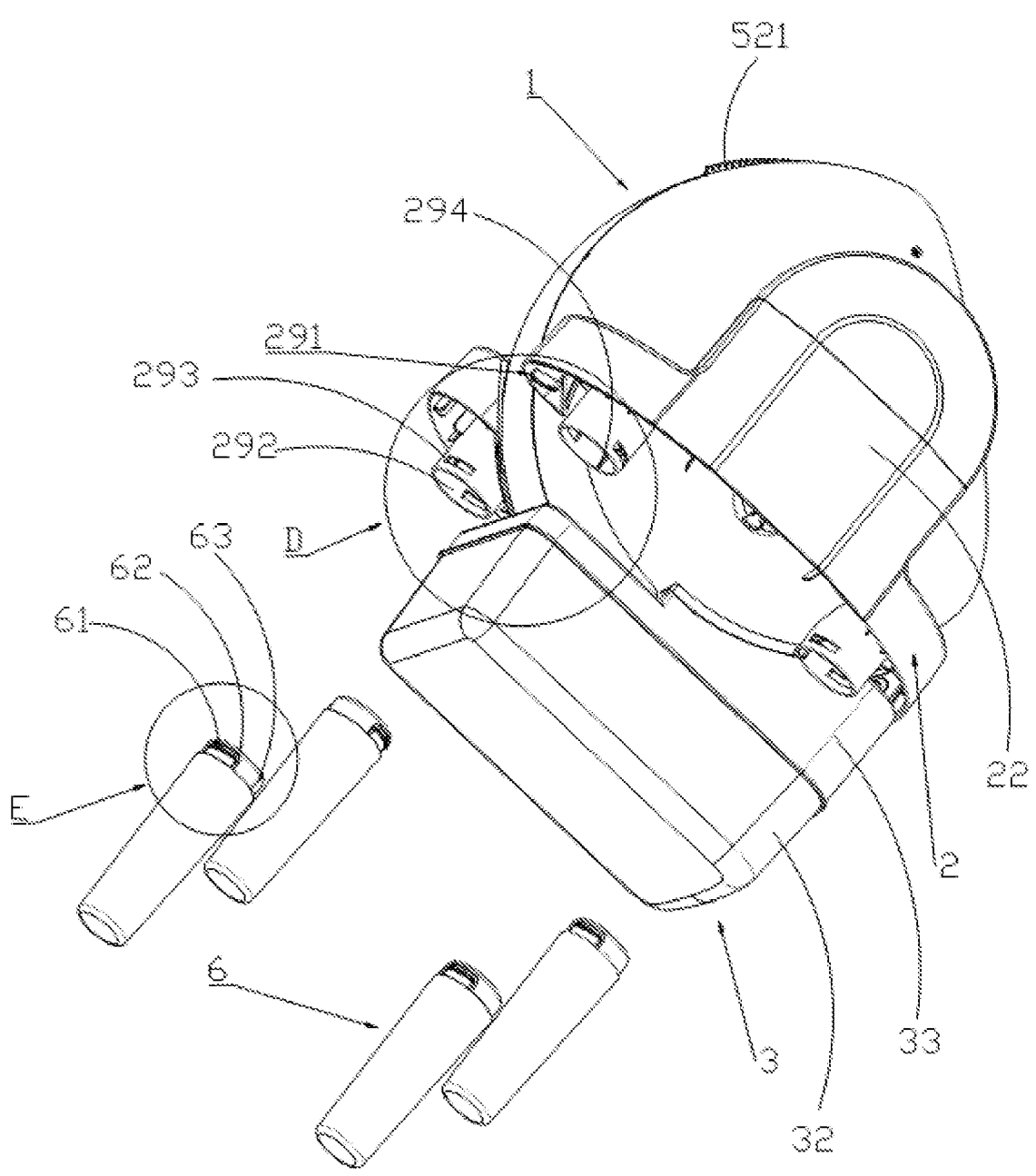
FIG. 10 is another whole structural schematic view of the present disclosure.
Figure 11:
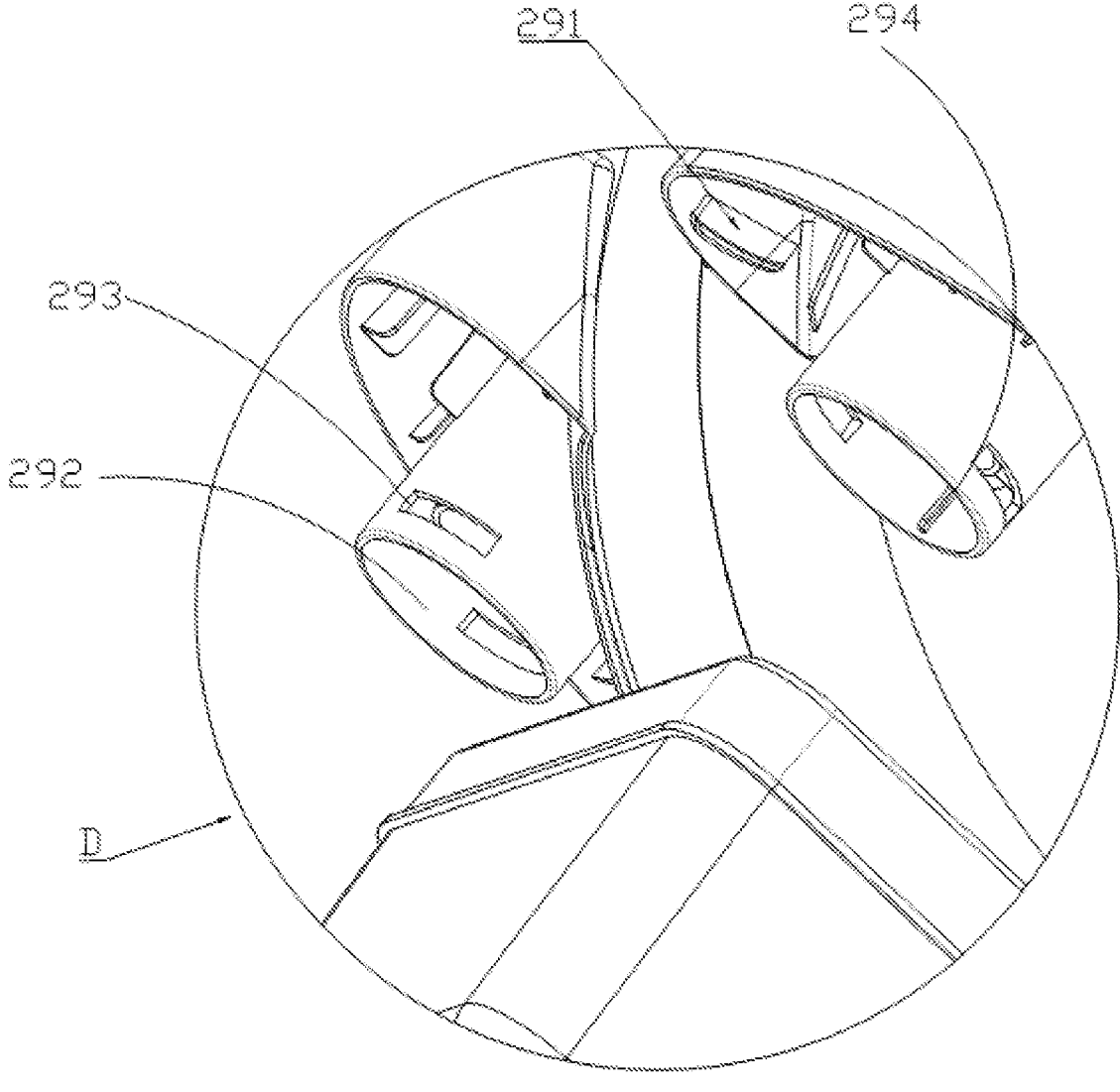
FIG. 11 is an enlarged view of the part D of FIG. 10.
Figure 12:
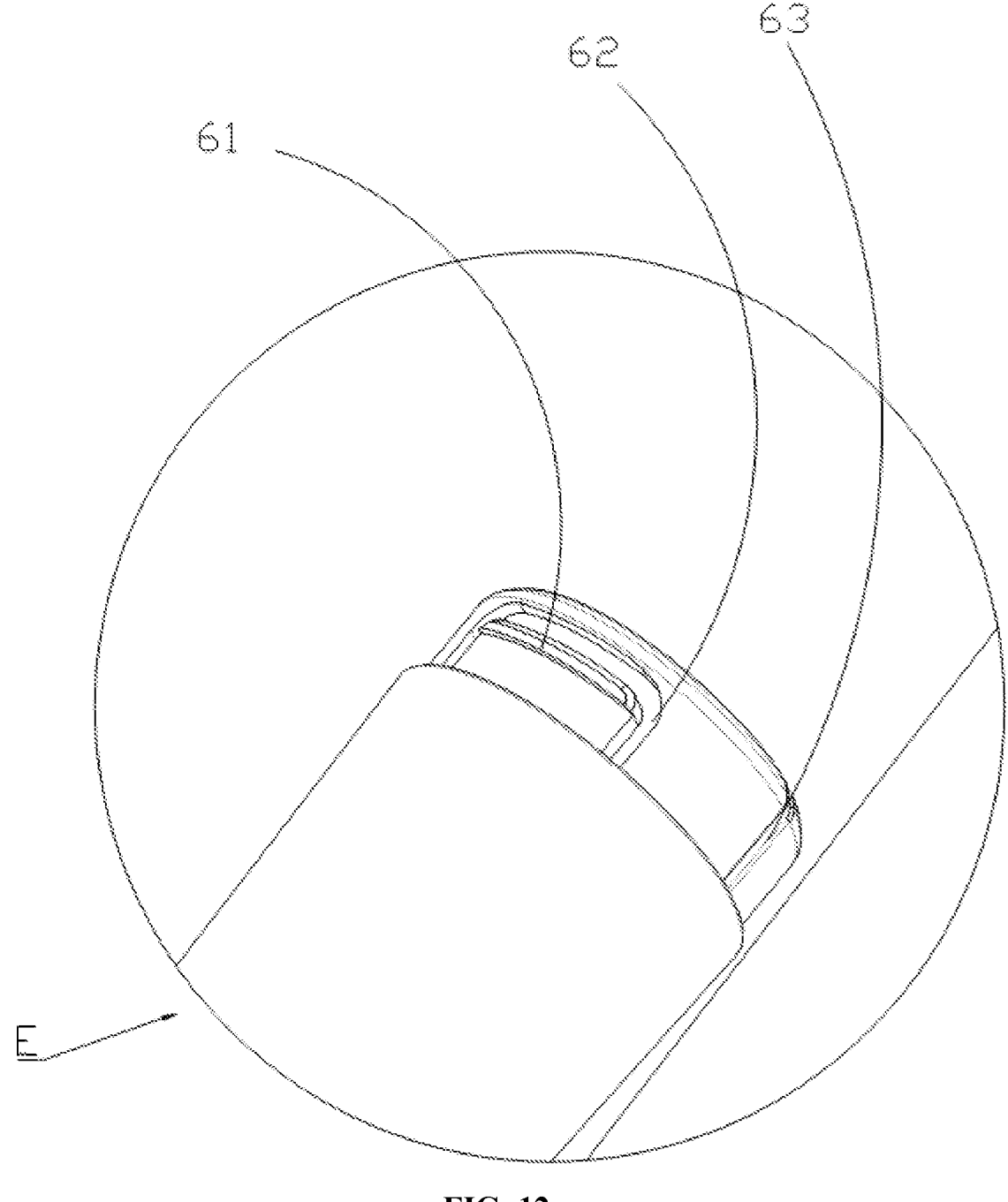
FIG. 12 is an enlarged view of the part E of FIG. 10.
Figure 13:
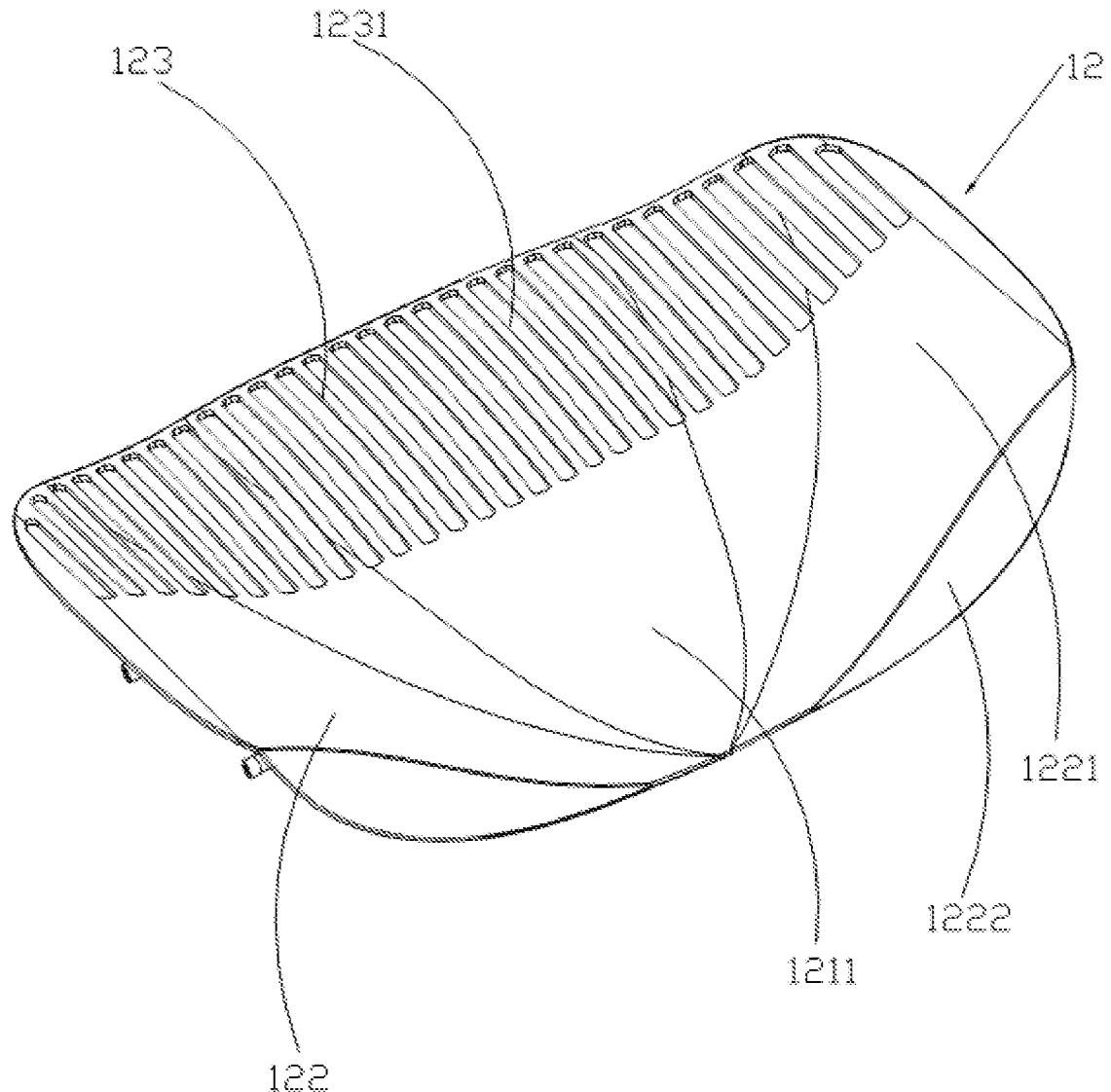
FIG. 13 is a structural schematic view of a sieve component.
Figure 14:
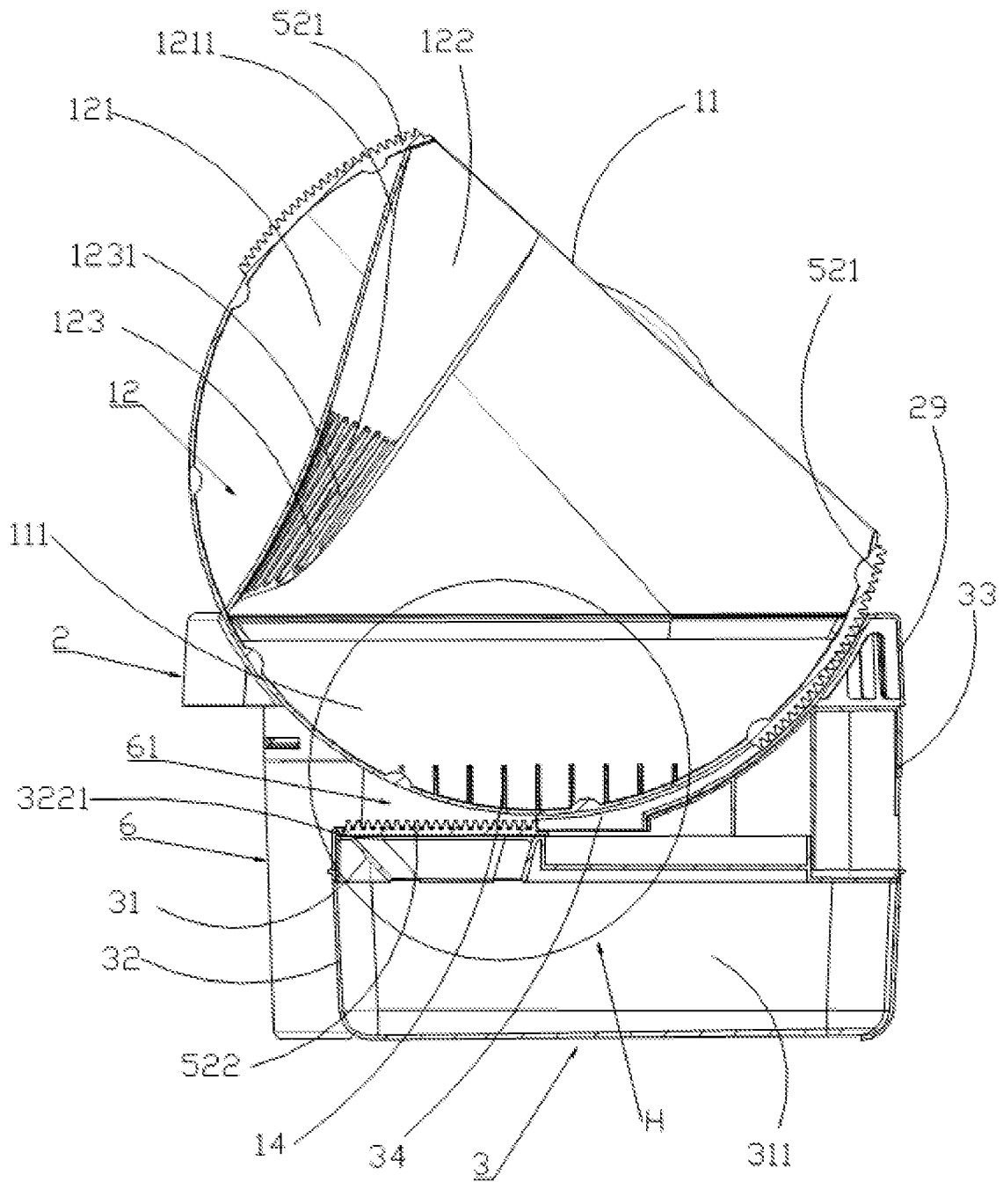
FIG. 14 is a cut-away view cut along the roller, the base, and the fecal collection box when the roller is in the original position.
Figure 15:
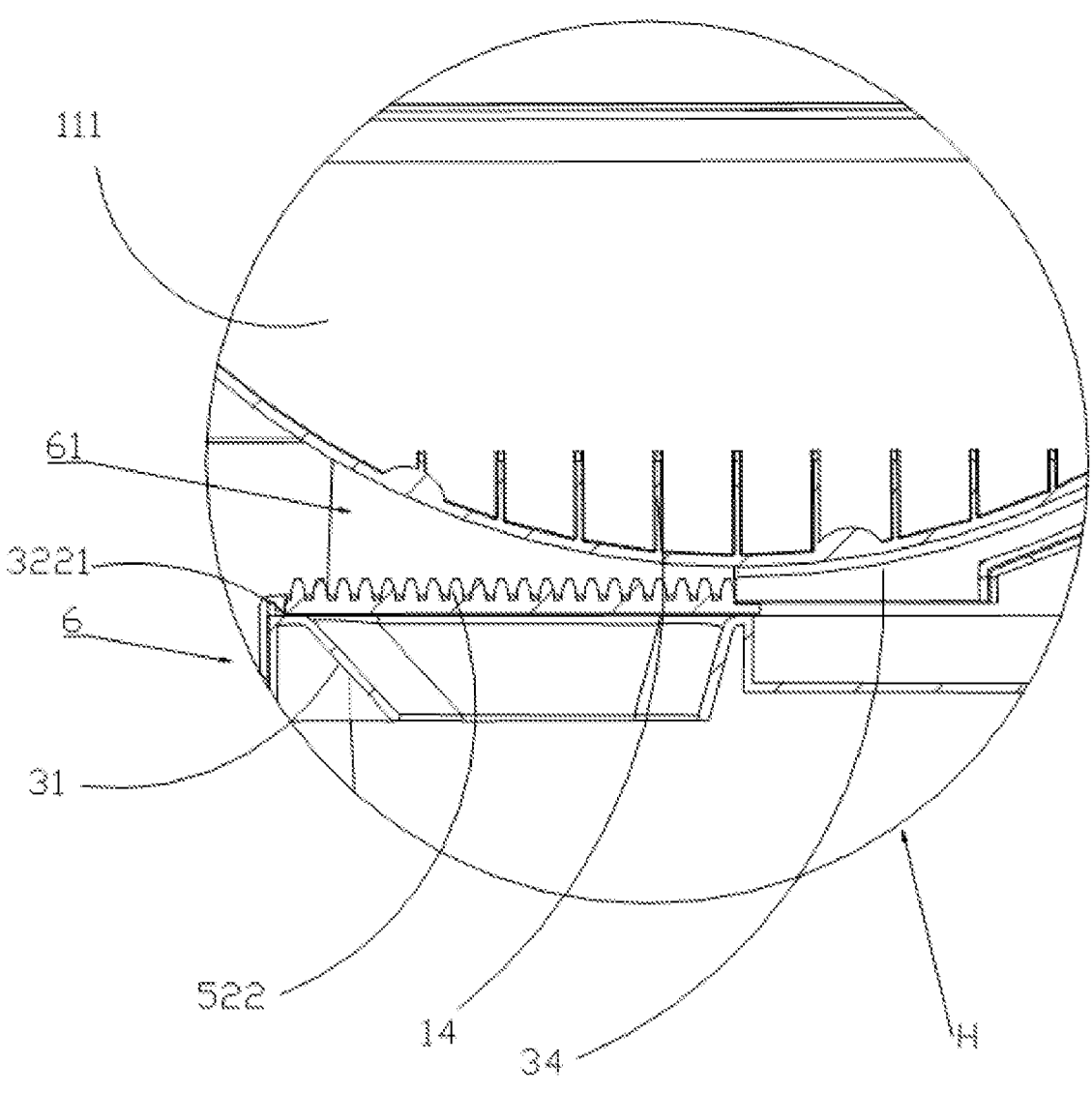
FIG. 15 is an enlarged view of the part H of FIG. 14.
Figure 16:
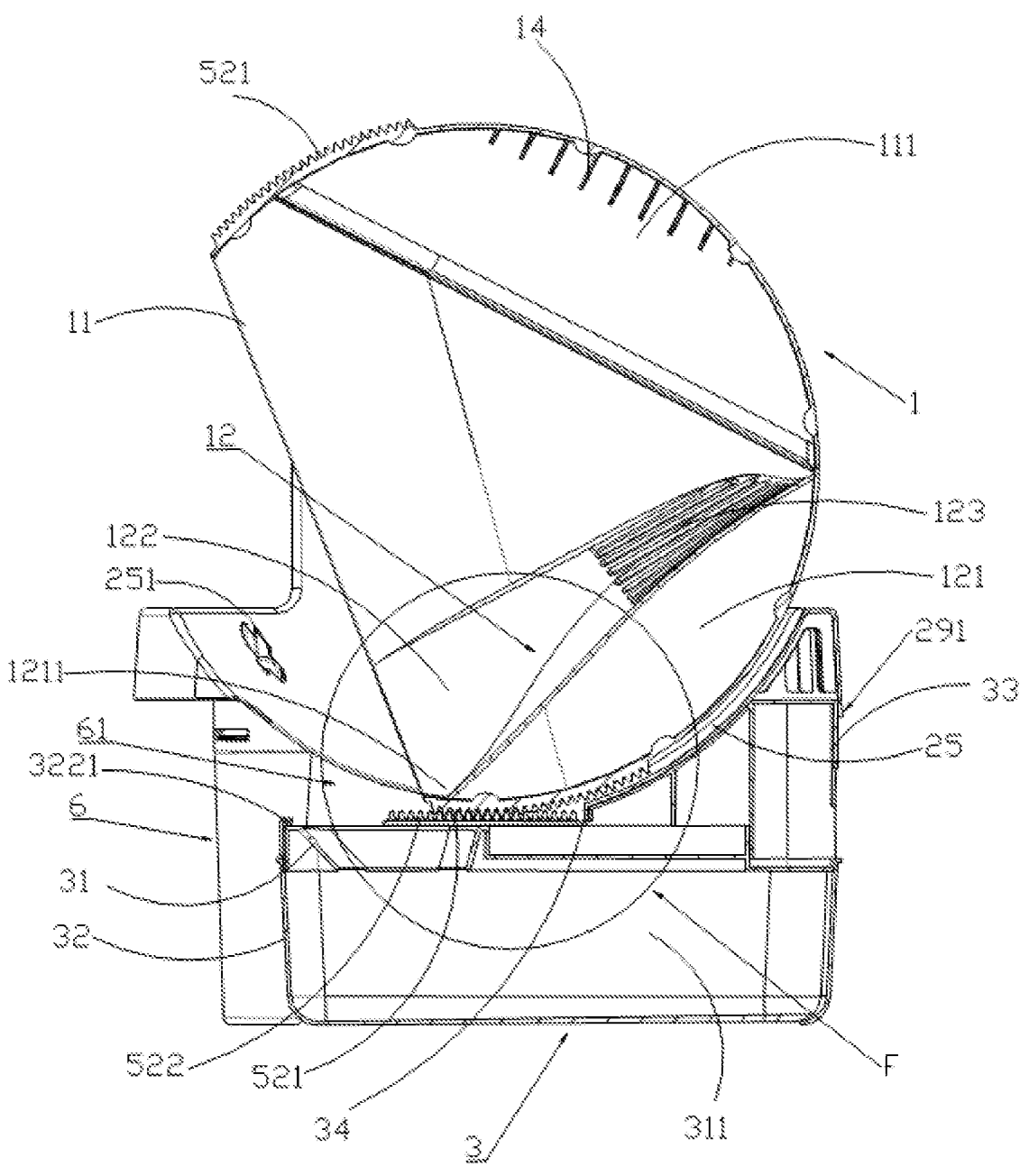
FIG. 16 is a cut-away view cut along the roller, the base, and the fecal collection box when the roller is in the defecation position.
Figure 17:
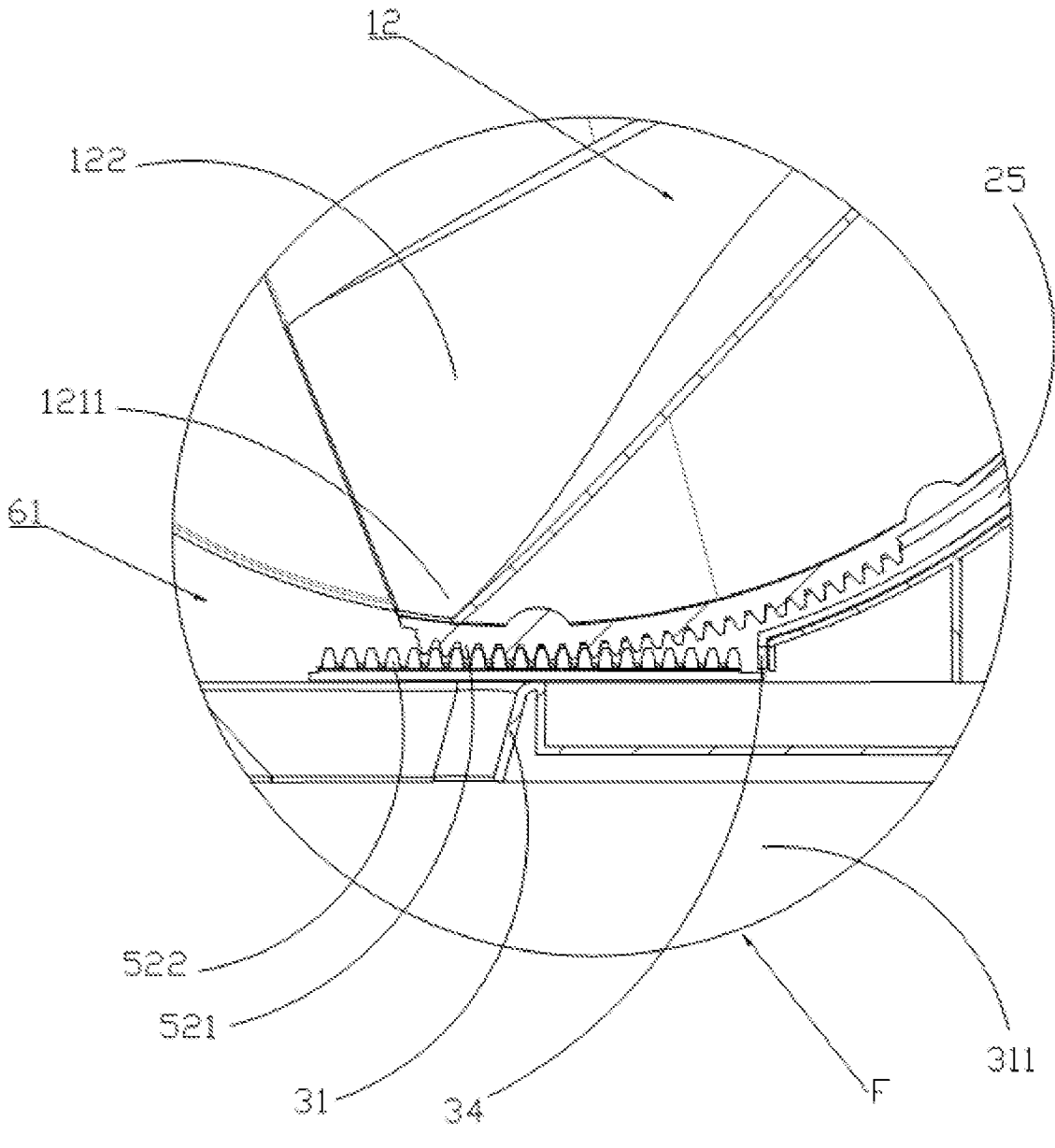
FIG. 17 is an enlarged view of the part F of FIG. 16.
Figure 18:
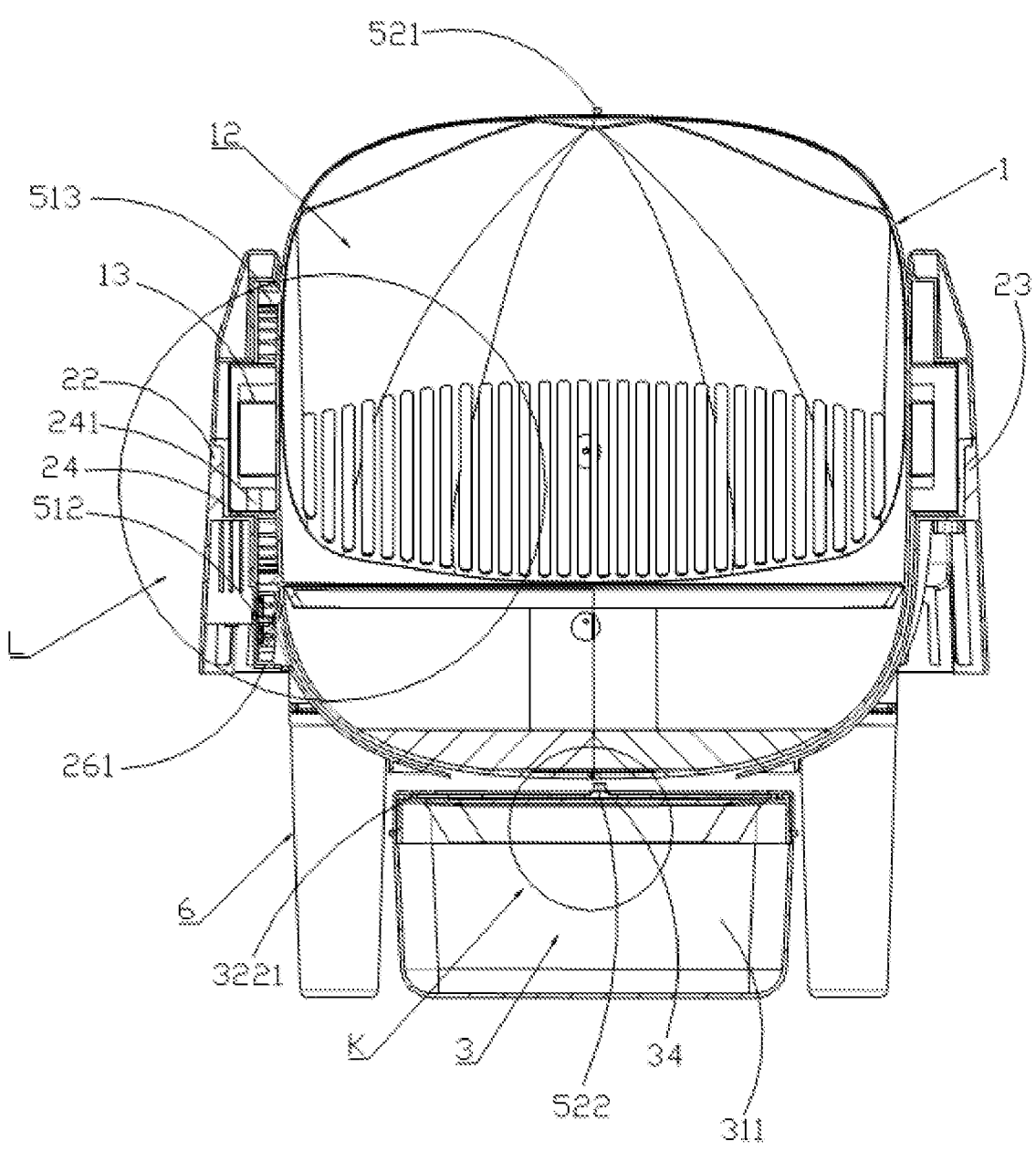
FIG. 18 is a cut-away view cut along a sealing door and a support arm.
Figure 19:
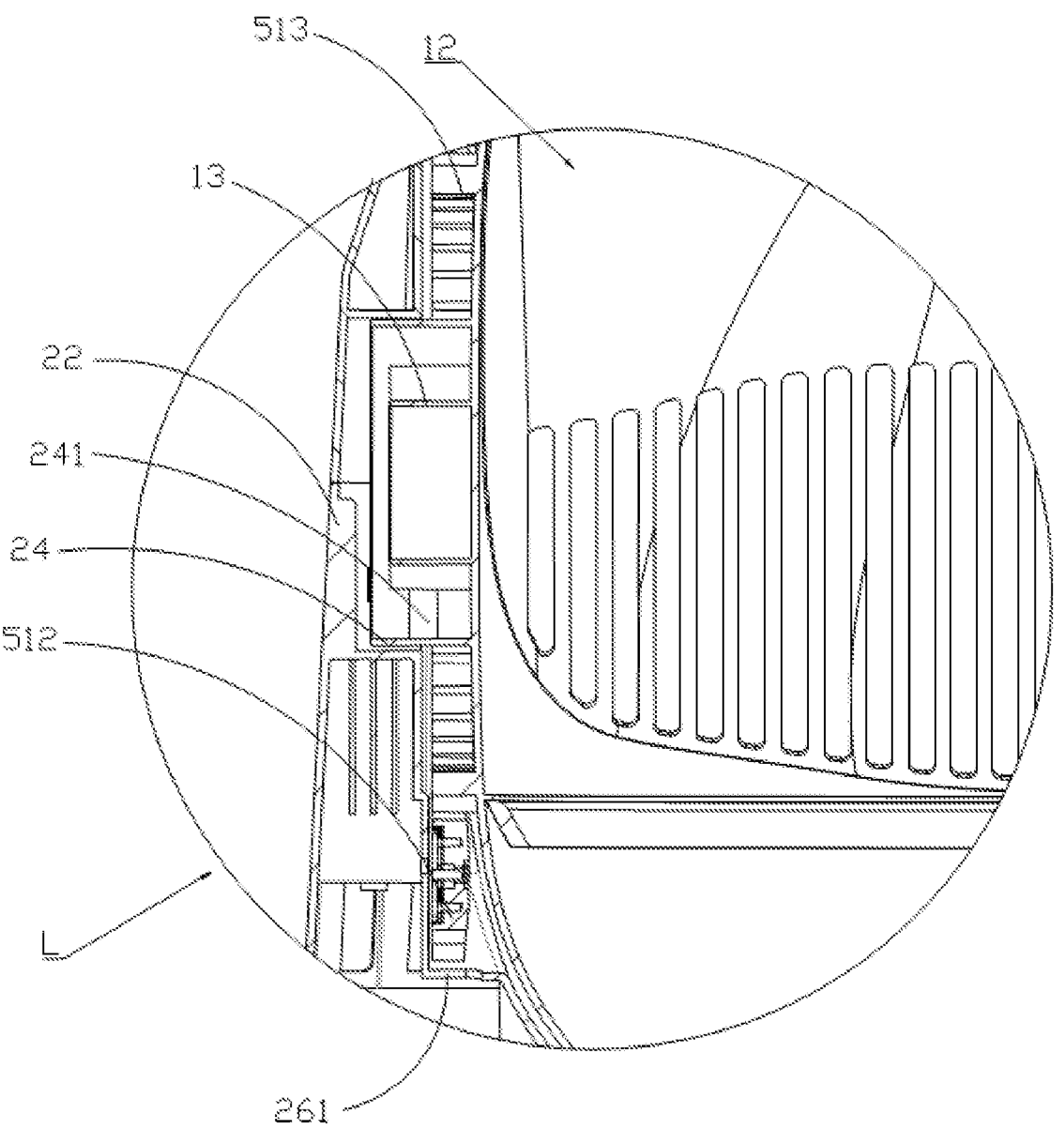
FIG. 19 is an enlarged view of the part L of FIG. 18.
Figure 20:
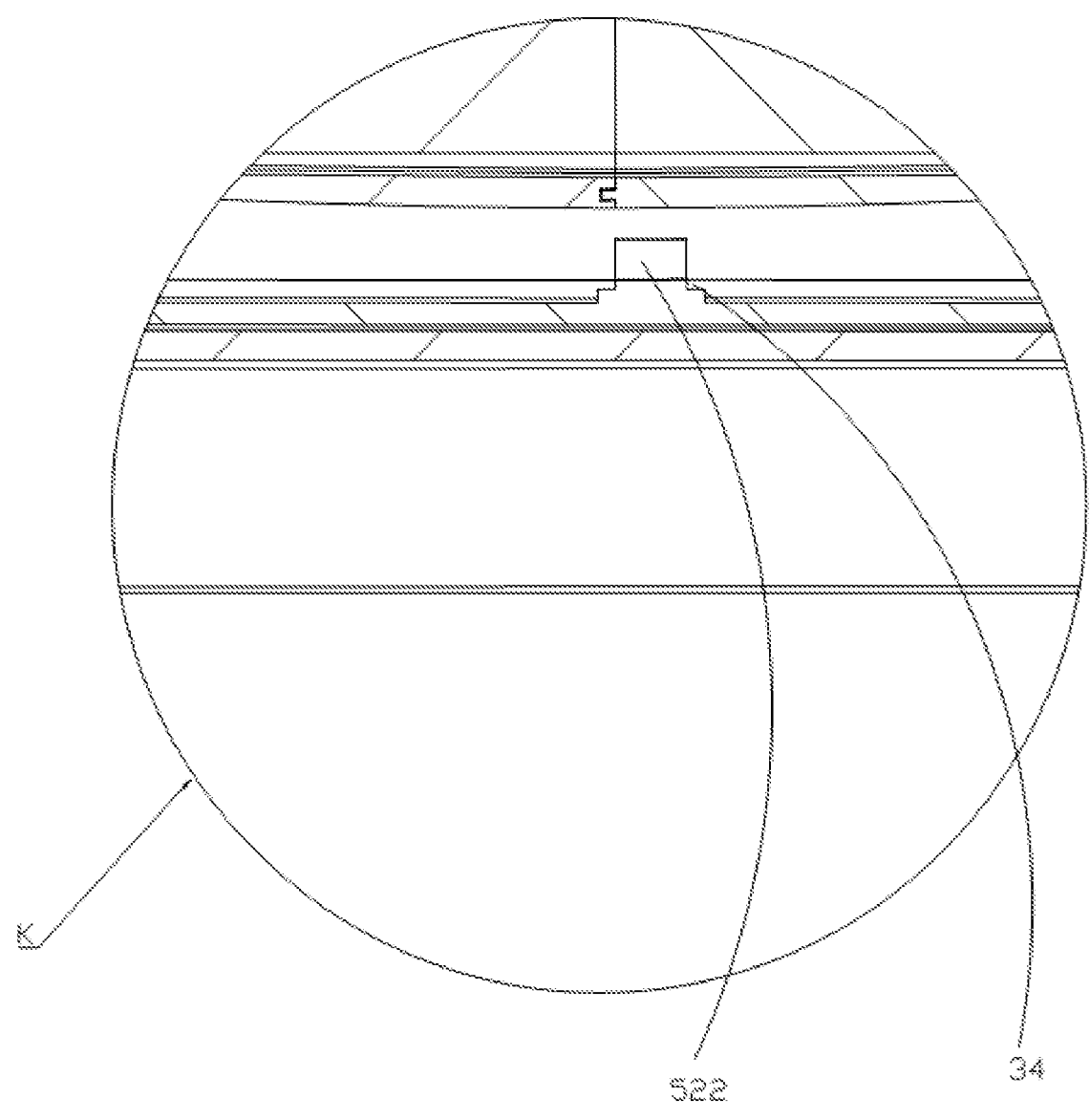
FIG. 20 is an enlarged view of the part K of FIG. 18.
Figure 21:
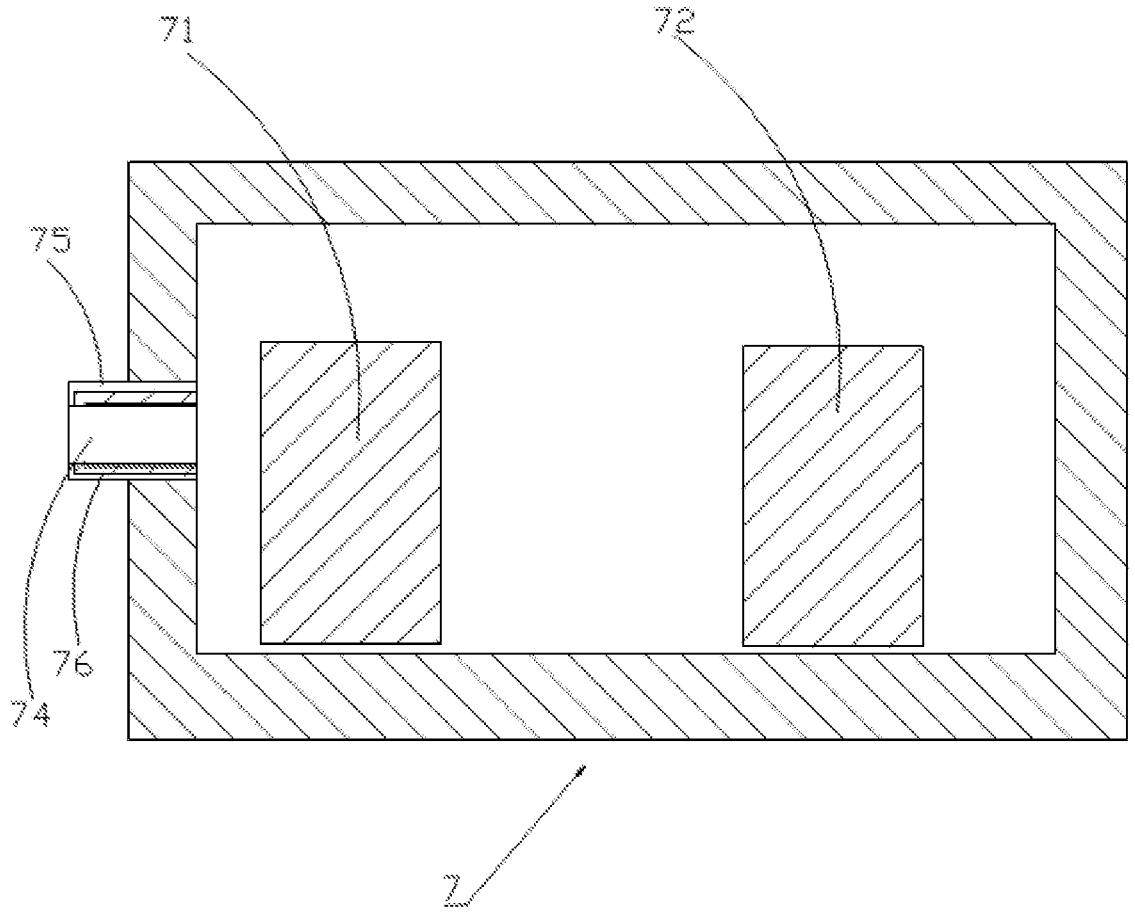
FIG. 21 is a cut-away view cut along a chassis.

Referring to FIG. 1 to FIG. 21, a pet toilet includes:
a roller 1, wherein the roller 1 has a first opening 11 and a first accommodation space 111, the first opening 11 is in communication with the first accommodation space 111, and the first accommodation space 111 is configured to accommodate excrement of pets and pet sand;

a base 2, wherein the base 2 is configured to support the roller 1;

a fecal collection box 4, wherein the fecal collection box 3 is provided under the base 2, the fecal collection box 3 has a second accommodation space 311 and a second opening 31, the second opening 31 is in communication with the second accommodation space 311;

a sealing door 4, wherein the scaling door 4 is provided at the second opening 31;

a sieve component 12, wherein the sieve component 12 is connected to the roller 1, and the sieve component 12 and an inner wall of the roller 1 surround to form a third accommodation space 121, the third accommodation space 121 is ambient to the first accommodation space 111, and the sieve component 12 is configured to sieve the pet sand and the excrement;

a drive device 5, wherein the drive device 5 is configured to drive the roller 1 to rotate on the base 2; when the first opening 11 rotates along with the roller 1 from an original position toward a defecation position, the pet sand is capable of entering the third accommodation space 121 through the sieve component 12, the excrement is limited out of the third accommodation space 121, and the sealing door 4 opens the second opening 31, the first opening 11 rotates along with the roller 1 to be aligned with the second opening 31, such that the excrement is capable of being discharged by its own gravity into the second accommodation space 311 through the first opening 11 and the second opening 31; when the first opening 11 rotates along with the roller 1 from the defecation position toward the original position, the pet sand in the third accommodation 121 is capable of passing through the sieve component 12 and falling back into the first accommodation space 111 by its own gravity, and the sealing door 4 closes the second opening 31.

By the above structure, when the roller 1 rotates from the original position toward the defecation position, the pet sand is capable of entering the third accommodation space 121 through the sieve component 12, the excrement is limited out of the third accommodation space 121, thereby realizing sieving of pet sands and pet excrement; the sealing door 4 opens the second opening 31, the first opening 11 rotates along with the roller 1 to be aligned with the second opening 31, such that the excrement is capable of being discharged by its own gravity into the second accommodation space 311 through the first opening 11 and the second opening 31, thereby completing separation and collection of the excrement; when the excrement is discharged into the second accommodation space 311 of the fecal collection box 3, and the roller 1 rotates from the defecation position toward the original position, the pet sand in the third accommodation 121 is capable of passing through the sieve component 12 and falling back into the first accommodation space 111 by its own gravity, and the sealing door 4 closes the second opening 31, so as to close the excrement in the fecal collection box 3 and prevent odor of the excrement from emitting into residential environment.

In this embodiment, when the first opening 11 rotates along with the roller 1 from the original position toward the defecation position, the pet sand is capable of entering the third accommodation space 121 through the sieve component 12, the excrement is limited out of the third accommodation space 121, the drive device 5 drives the sealing door 4 to open the second opening 31, the first opening 11 rotates along with the roller 1 to be aligned with the second opening 31, such that the excrement is capable of being discharged by its own gravity into the second accommodation space 311 through the first opening 11 and the second opening 31; when the first opening 11 rotates along with the roller 1 from the defecation position toward the original position, the pet sand in the third accommodation 121 is capable of passing through the sieve component 12 and falling back into the first accommodation space 111 by its own gravity, and the drive device 5 drives the sealing door 4 to close the second opening 31. Among them, the drive device 5 includes a drive assembly 51 and a transmission assembly 52, wherein the drive device 5 is configured to drive the roller 1 to rotate on the base 2; when the first opening 1 rotates along with the roller 1 from the original position toward the defecation position, the roller 1, through the transmission device 52, drives the sealing door 4 to open the second opening 31, the first opening 11 rotates along with the roller 1 to be aligned with the second opening 31, such that the excrement is capable of being discharged by its own gravity into the second accommodation space 311 through the first opening 11 and the second opening 31; when the first opening 11 rotates along with the roller 1 from the defecation position toward the original position, the pet sand in the third accommodation 121 is capable of passing through the sieve component 12 and falling back into the first accommodation space 111 by its own gravity, and the roller 1, through the transmission device 52, drives the sealing door 4 to close the second opening 31. Specifically, the transmission assembly 52 includes a first transmission element 521 and a second transmission element 522, the first transmission element 521 is provided on an outer side wall of the roller 1, the second transmission element 522 is provided on the sealing door 4; when the first opening 11 rotates along with the roller 1 from the original position toward the defecation position, the first transmission element 521 is connected in transmission with the second transmission element 522, the roller 1, by rotation, drives the first transmission element 521 to rotate, the first transmission element 521 rotates to drive the second transmission element 522 to move, such that the sealing door 4 moves along with the second transmission element 522 until opening the second opening 31, and the first opening 11 rotates along with the roller 1 to be aligned with the second opening 31, such that the excrement is capable of being discharged by its own gravity into the second accommodation space 311 through the first opening 11 and the second opening 31; when the first opening 11 rotates along with the roller 1 from the defecation position toward the original position, the first transmission element 521 is connected in transmission with the second transmission element 522, the pet sand in the third accommodation 121 is capable of passing through the sieve component 12 and falling back into the first accommodation space 111 by its own gravity, and the first transmission element 521 rotates to drive the second transmission element 522 to move, such that the sealing door 4 moves along with the second transmission element 522 until closing the second opening 31. Furthermore, the fecal collection box 3 is provided thereon with a sliding rail 32, the roller 1, by rotation, drives the first transmission element 521 to rotate, the first transmission element 521 rotates to drive the second transmission element 522 to move, such that the sealing door 4 slides along with the second transmission element 522 on the sliding rail 32 until opening or closing the second opening 31. Furthermore, the first transmission element 521 is an first rack of an arc shape arranged along an outer circumferential wall of the roller 1, the sealing door 4 is a scaling door 4 of a plat and straight shape, the second transmission element 522 is a second rack of a plat and straight shape arranged on the sealing door 4, the sliding rail 32 is a sliding rail 32 of a plat and straight shape; the roller 1, by rotation, drives the first rack to rotate, such that the first rack drives the second rack to move, and the sealing door 4 slides along with the second rack on the sliding rail 32 until opening or closing the second opening 31. By the above structure, the arrangement of the drive device 5 is effectively realized. The drive assembly 51 drives the roller 1 to rotate on the base 2, and the roller 1, by rotation, drives the first rack to rotate; when the roller 1 rotates from the original position toward the defecation position, the first rack meshes with the second rack, such that the first rack drives the second rack to move, and the sealing door 4 slides along with the second rack on the sliding rail 32 until opening the second opening 31, that is, the sealing door 4 slides along with the second transmission element 522 on the sliding rail 32 until opening the second opening 31, thereby facilitating discharging the excrement by its own gravity into the second accommodation space 311 of the fecal collection box 3 through the first opening 11 and the second opening 31; when the roller 1 rotates from the defecation position toward the original position, the first rack meshes with the second rack, such that the first rack drives the second rack to move, and the sealing door 4 slides along with the second rack on the sliding rail 32 until closing the second opening 31, that is, the sealing door 4 slides along with the second transmission element 522 on the sliding rail 32 until closing the second opening 31, thereby preventing odor of the excrement from emitting into residential environment.

Figure 22:
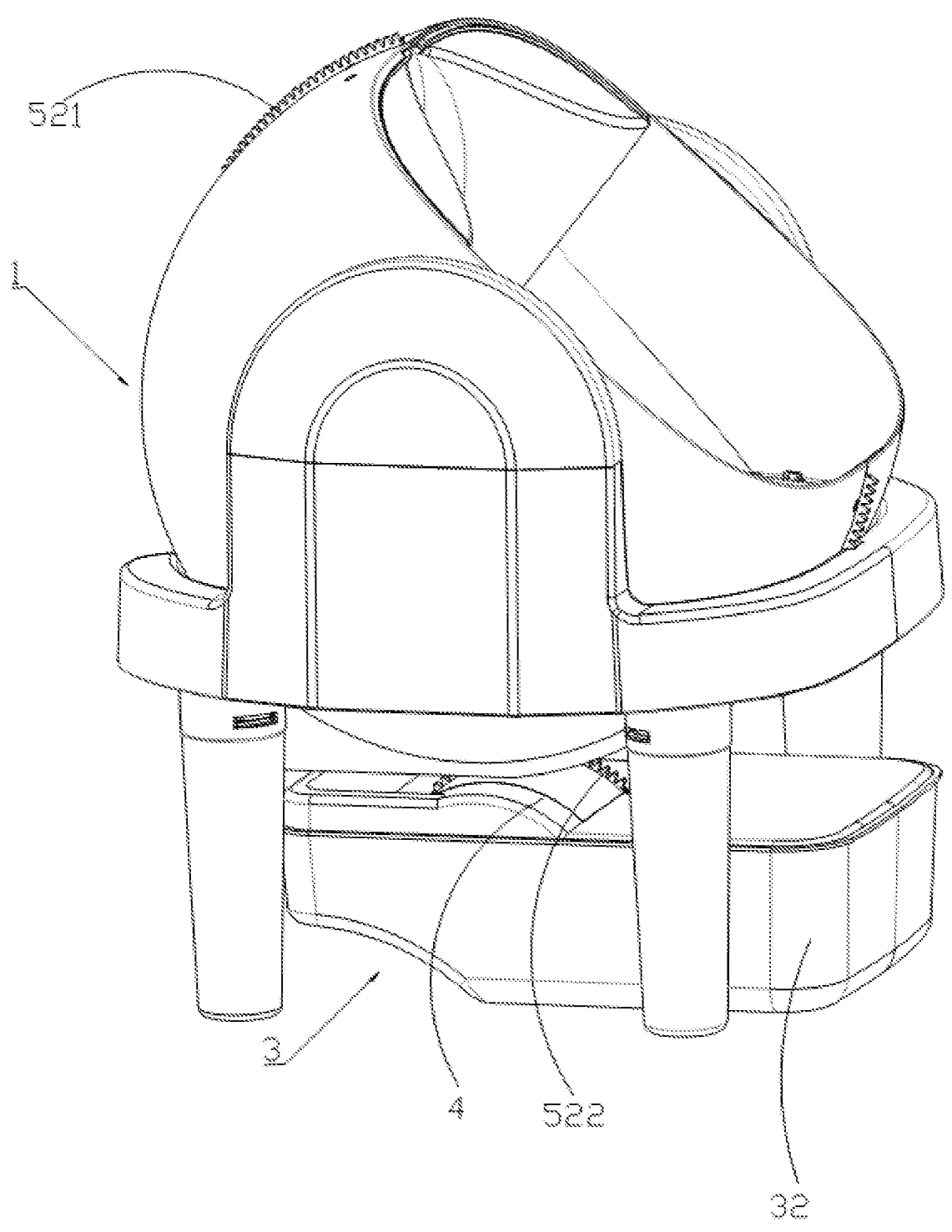
FIG. 22 is a structural schematic view of an arc-shaped sealing door.
Figure 23:
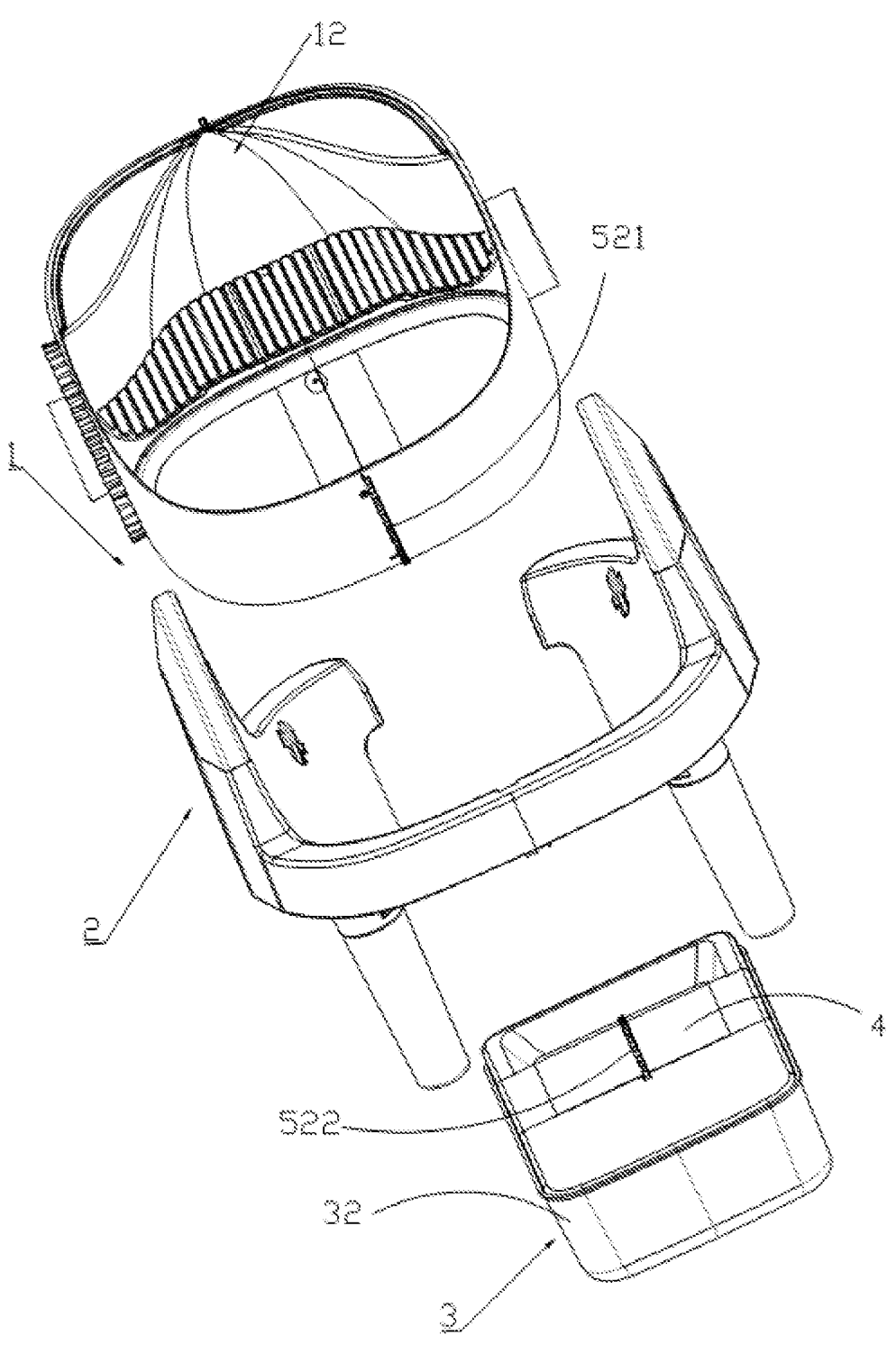
FIG. 23 is an exploded view of the structural schematic view of the arc-shaped sealing door.
Figure 24:
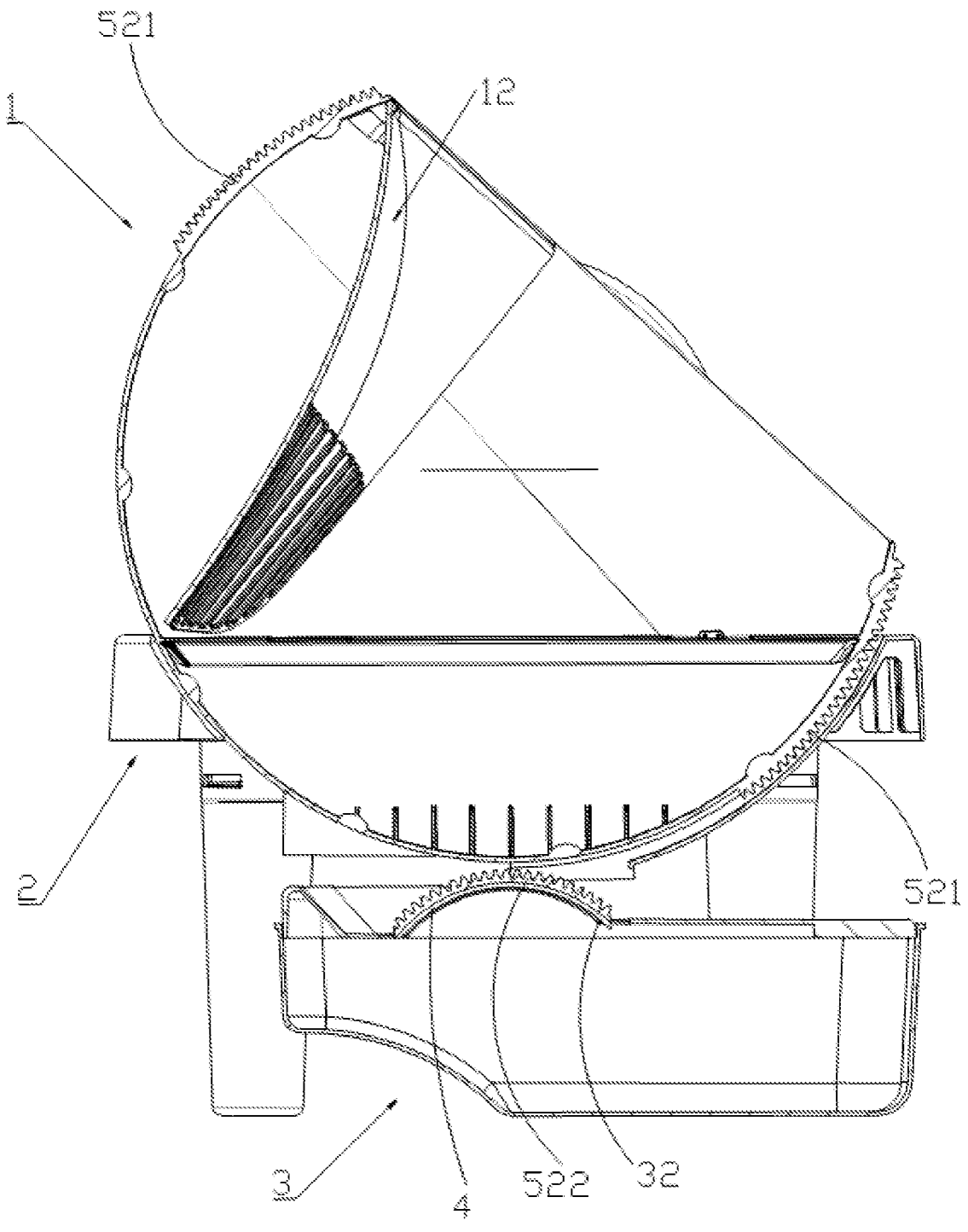
FIG. 24 is a cut-away view cut along the arc-shaped sealing door.

Referring to FIG. 22 to FIG. 24, in other embodiments, it is possible that: the first transmission element 521 is an first rack of an arc shape arranged along an outer circumferential wall of the roller 1, the sealing door 4 is a sealing door 4 of an arc shape, the second transmission element 522 is a second rack of an arc arranged on the sealing door 4, the sliding rail 32 is a sliding rail 32 of an arc shape; the roller 1, by rotation, drives the first rack to rotate, such that the first rack drives the second rack to move, and the sealing door 4 slides along with the second rack on the sliding rail 32 until opening or closing the second opening 31.

In this embodiment, the base 2 is further provided thereon with a third opening 21, the third opening 21 is located between the roller 1 and the second opening 31; when the first opening 11 rotates along with the roller 1 from the original position toward the defecation position, the pet sand is capable of entering the third accommodation space 121 through the sieve component 12, the excrement is limited out of the third accommodation space 121, and the scaling door 4 opens the second opening 31, the first opening 11 rotates along with the roller 1 to be aligned with the third opening 21 and the second opening 31, such that the excrement is capable of being discharged by its own gravity into the second accommodation space 311 through the first opening 11 and the second opening 31; when the first opening 11 rotates along with the roller 1 from the defecation position toward the original position, the first opening 11 and the second opening 31 are staggered with the third opening 21, the pet sand in the third accommodation 121 is capable of passing through the sieve component 12 and falling back into the first accommodation space 111 by its own gravity, and the sealing door 4 closes the second opening 31. By the above structure, the arrangement of the drive device 5 is effectively realized. The drive assembly 51 drives the roller 1 to rotate on the base 2, and the roller 1, by rotation, drives the first rack to rotate; when the roller 1 rotates from the original position toward the defecation position, the first rack meshes with the second rack, such that the first rack drives the second rack to move, and the scaling door 4 slides along with the second rack on the sliding rail 32 until opening the second opening 31, that is, the scaling door 4 slides along with the second transmission element 522 on the sliding rail 32 until opening the second opening 31, thereby facilitating discharging the excrement by its own gravity into the second accommodation space 311 of the fecal collection box 3 through the first opening 11, the third opening 21, and the second opening 31; when the roller 1 rotates from the defecation position toward the original position, the first opening 11 rotates to be staggered with the second opening 31 and the third opening 21, the first rack meshes with the second rack, such that the first rack drives the second rack to move, and the scaling door 4 slides along with the second rack on the sliding rail 32 until closing the second opening 31, that is, the sealing door 4 slides along with the second transmission element 522 on the sliding rail 32 until closing the second opening 31, thereby preventing odor of the excrement from emitting into residential environment.

In this embodiment, the drive assembly 5 includes a drive motor 511, a driving gear 512, and a driven gear 513; the drive motor 511 has a drive shaft 514, the driving gear 512 is sheathed on the drive shaft 514, the driven gear 513 is arranged on the roller 1, and the driven gear 513 meshes with the driving gear 512 such that the drive shaft 514 rotates to drive the driving gear 512 to rotate, the driving gear 512 rotates to drive the driven gear 513 to rotate, and the driven gear 513 rotates to drive the roller 1 to rotate on the base 2. Among them, one side of the base 2 is provided with a first support arm 22, another side of the base 2 is provided with a second support arm 23, each of the first support arm 22 and the second support arm 23 is provided with a support groove 24; both the two sides of the roller 1 have support shafts 13, the support shafts 13 are located in the support grooves 24, and each support groove 24 is provided therein with a plurality of first wheels 241, the first wheels 241 support the support shafts 13. Specifically, the base 2 further has a recessed portion 25 recessing toward a direction away from the roller 1; when the roller 1 is supported on the base 2, there is a gap between the roller 1 and an inner wall of the recessed portion 25, and the recessed portion 25 is provided thereon with a second wheel 251. Furthermore, the third opening 21 is arranged in the recessed portion 25. By the above structure, when the driving gear 512 drives the driven gear 513 and the roller 1 to rotate, the support shafts 13 are supported by the first wheels 241, such that the roller 1 rotates on the support arms of the base 2 through the support shafts 13, and transmission efficiency is effectively improved. Moreover, weight of the roller 1 is concentrated on the support arms at two sides of the base 2, the weight of the roller 1 can be prevented from being concentrated on the recessed portion 25, and the roller 1 is prevented from squeezing the recessed portion 25 to cause deformation and damage of the base 2. Furthermore, since the gap exists between the roller 1 and an inner wall of the recessed portion 25, and the recessed portion 25 is provided thereon with the second wheel 251, when weight carried inside the roller 1 is large, for example, the pet sand stored in the roller 1 is too much, the outer wall of the roller 1 will deform under the action of gravity, the gap existing between the roller 1 and an inner wall of the recessed portion 25 can also further prevent the weight of the roller 1 from being concentrated in the recessed portion 25, and prevent the roller 1 prevented from squeezing the recessed portion 25 to cause deformation and damage of the base 2. Moreover, the second wheel 1 in the recessed portion 25 can assist the roller 1 in rotation, such that the roller 1 can rotate on the support arms of the base 2 more smoothly.

In this embodiment, below the support groove 24 there is further provided with a mounting groove 26, the mounting groove 26 is in communication with the support groove 24, the driving gear 512 is arranged in the mounting groove 26, an inner wall of the mounting groove 26 is provided with a fourth opening 261, and the mounting groove 26 is in communication with the outside through the fourth opening 261. By the above structure, if pet sand enters the support groove 24 and the mounting groove 26, the pet sand can be discharged to the outside through the fourth opening 261, it can be effectively prevented that the pet sand blocks in the support groove 24 and the mounting groove 26, such that the pet sand is prevented from jamming the driving gear 512 and the driven gear 513, and the roller 1 can rotate more smoothly on the support arms.

In this embodiment, support legs 6 are further included. The support legs 6 are connected to the base 2 and used to support the base 2, and a fourth accommodation space 61 is formed among bottom ends of the support legs 6 and the base 2, the fecal collection box 3 is arranged in the fourth accommodation space 61. The base 2 includes a left side wall 27, a right side wall 28, and a connection wall 29 connecting the left side wall 27 with the right side wall 28, the first support arm 22 is arranged on the left side wall 27, the second support arm 23 is arranged on the right side wall 28; the left side wall 27 has a first end 271 and a second end 272, the right side wall 28 has a third end 281 and a fourth end 282, a first safety notch 273 is formed between the first end 271 of the left side wall 27 and the third end 281 of the right side wall 28, such that an open first safety space 274 is formed between the base 2 and the roller 1.

By the above structure, when the roller 1 rotates on the base 2, if there is a pet in the first safety space 274 between the base 2 and the roller 1, the pet can escape through the first safety notch 273, thus the pet can be prevented from being pinched by the base 2 and the rotating roller 1.

In this embodiment, the first support arm 22 is located between the first end 271 and the third end 281, the second support arm 23 is located between the second end 272 and the fourth end 282.

Among them, the second end 272 of the left side wall 27 is connected to the fourth end of the right side wall 28. Specifically, the fecal collection box 3 includes an accommodation box body 32 and a filling protrusion 33, the filling protrusion 33 is connected to the accommodation box body 32, and the filling protrusion 33 is configured to fill a gap between the connection wall 29 and the accommodation box body 32. By the above structure, the filling protrusion 33 can fill the gap between the connection wall 29 and the accommodation box body 32, so as to prevent pets from entering the gap, and thereby prevent pets from being pinched by the base 2 and the rotating roller 1. Furthermore, the support legs 6 are further included. The support legs 6 are connected to the base 2 and used to support the base 2, and the fourth accommodation space 61 is formed among bottom ends of the support legs 6 and the base 2, the fecal collection box 3 is arranged in the fourth accommodation space 61. The base 2 includes the left side wall 27, the right side wall 28, and the connection wall 29 connecting the left side wall 27 with the right side wall 28, the first support arm 22 is arranged on the left side wall 27, the second support arm 23 is arranged on the right side wall 28; the left side wall 27 has the first end 271 and the second end 272, the right side wall 28 has the third end 281 and the fourth end 282, the first safety notch 273 is formed between the first end 271 of the left side wall 27 and the third end 281 of the right side wall 28, such that the open first safety space 274 is formed between the base 2 and the roller 1. The fecal collection box 3 includes the accommodation box body 32 and the filling protrusion 33, the filling protrusion 33 is connected to the accommodation box body 32, and the filling protrusion 33 is configured to fill the gap between the connection wall 29 and the accommodation box body 32. The fecal collection box 3 is further provided thereon with a first avoidance groove 34, the first avoidance groove 34 extends corresponding to the filling protrusion 33, and the first avoidance groove 34 is configured to avoid the first rack and the second rack. By the above structure, the first avoidance groove 34 can avoid the first rack and the second rack, the second rack and the sealing door 4 can slide on the sliding rail 32 more smoothly, and the first rack can also rotate along with the roller 1 more smoothly, thereby driving the second rack and the sealing door 4 to slide.

Figure 25:
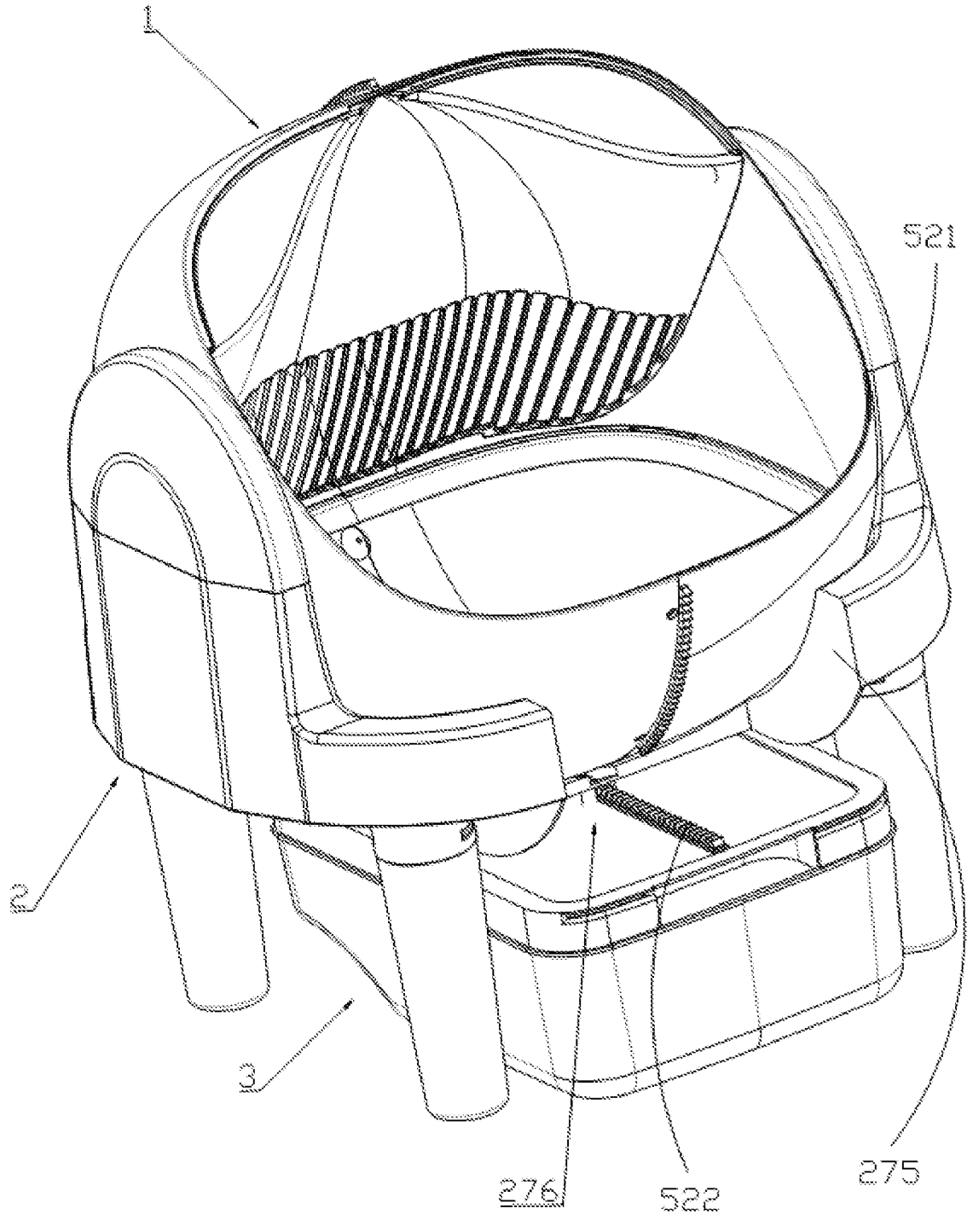
FIG. 25 is a structural schematic view of a base having a second safety notch.
Figure 26:
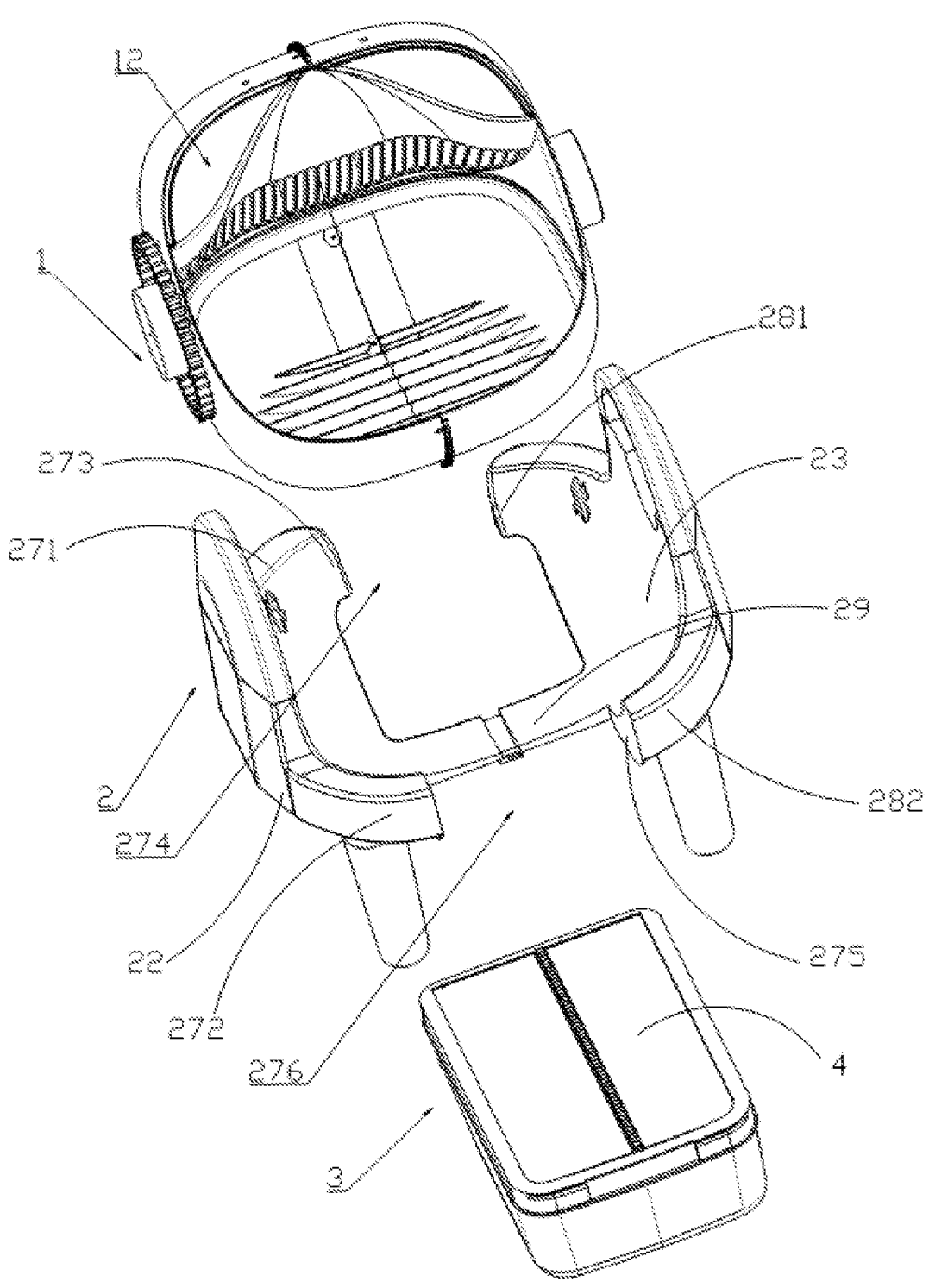
FIG. 26 is an exploded view of the base having the second safety notch.
Figure 27:
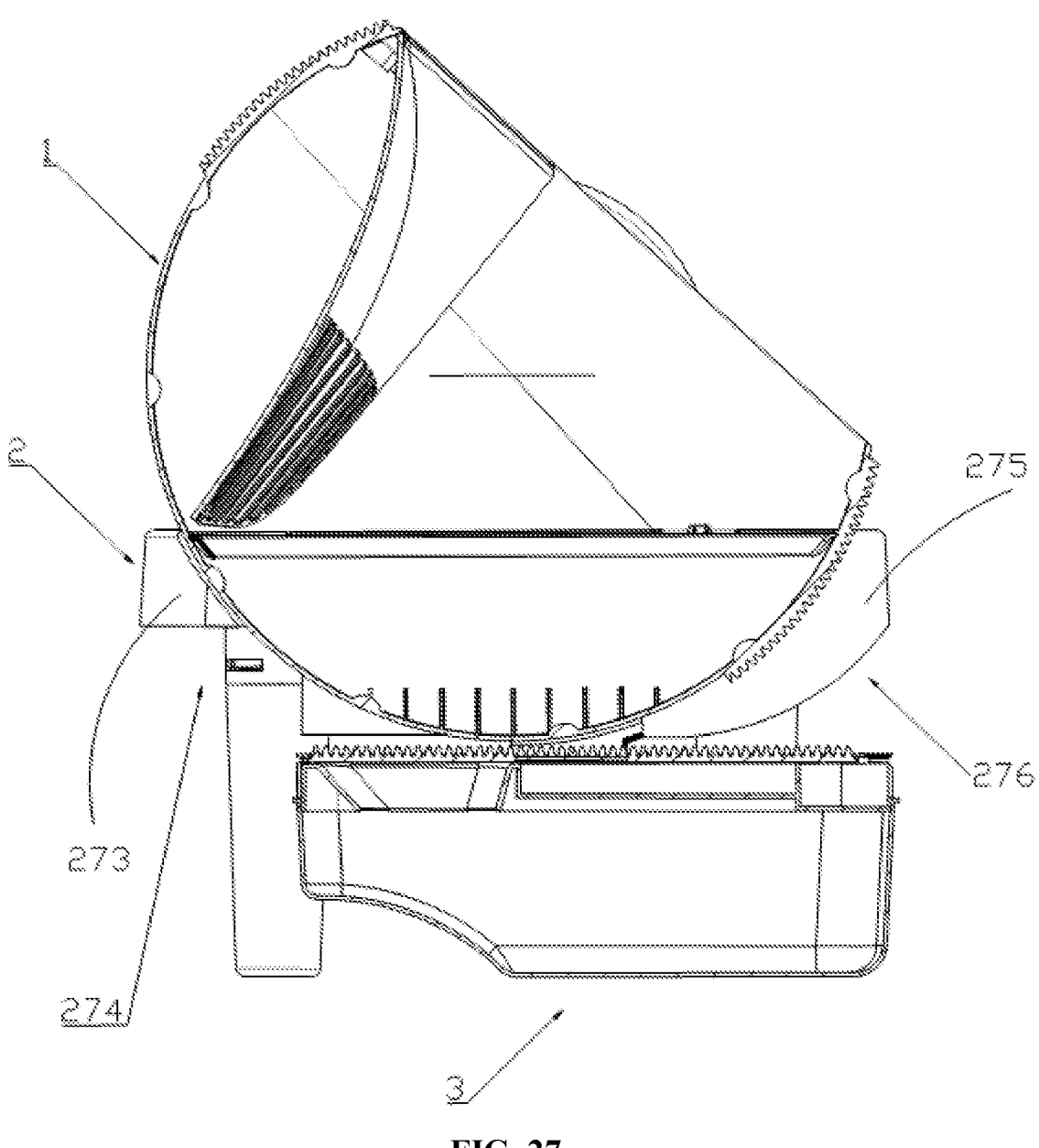
FIG. 27 is a cut-away view cut along the second safety notch.

Referring to FIGS. 25-27, in other embodiments, it is possible to connect a middle part of the left side wall 27 and a middle part of the right side wall 28 through the connection wall 29, such that a second safety notch 275 is formed between the second end 272 of the left side wall 27 and the fourth end 282 of the right side wall 28, and an open second safety space 276 is formed between the base 2 and the roller 1. when the roller 1 rotates on the base 2, if there is a pet in the second safety space 276 between the base 2 and the roller 1, the pet can escape through the second safety notch 275, thus the pet can be prevented from being pinched by the base 2 and the rotating roller 1. Moreover, the fecal collection box 3 is further provided thereon with the first avoidance groove 34, the first avoidance groove 34 is configured to avoid the first rack and the second rack.

Figure 28:
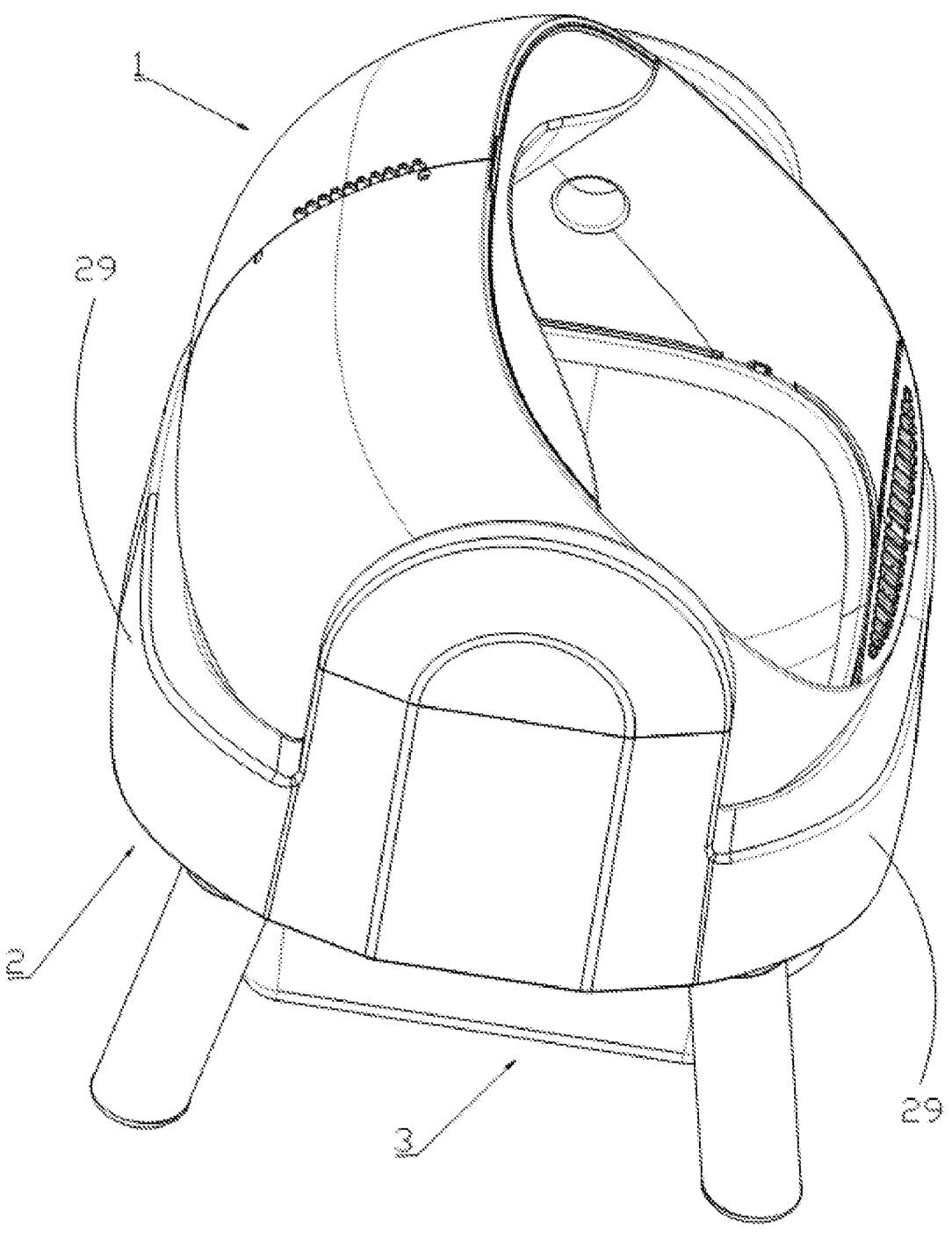
FIG. 28 is another whole structural schematic view of the present disclosure.
Figure 29:
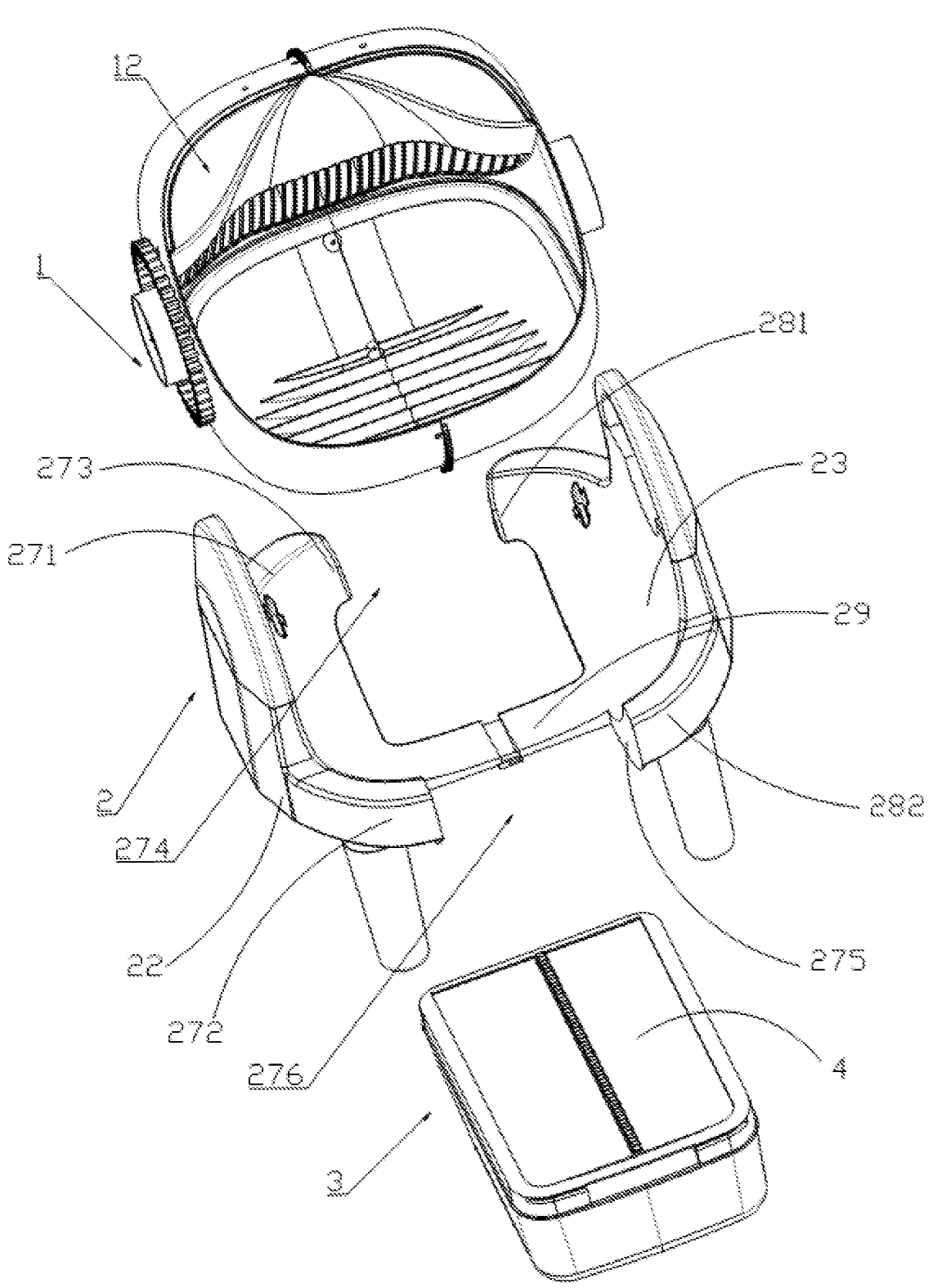
FIG. 29 is another exploded view of the present disclosure.

Referring to FIG. 28 to FIG. 29, in other embodiments, in order to improve stability of the base 2, it is also possible to connect the first end 271 of the left side wall 27 with the third end 281 of the right side wall 28 through the connection wall 29, and connect the second end 272 of the left side wall 27 with the fourth end 282 of the right side wall 28 through the connection wall 29, thereby enhancing the stability of the base 2.

In this embodiment, the fecal collection box 3 has a first outer side wall 35 and a first bottom wall 36, the first bottom wall 36 is connected with the first outer side wall 35; when a distance between one side of the first bottom wall 36 and a bottom end of the first outer side wall 35 is defined as a first distance, and a distance between another side of the first bottom wall 36 and the bottom end of the first outer side wall 35 is defined as a second distance, the first distance is different from the second distance such that the first bottom wall 36 is arranged by an inclined angle. Among them, the second distance is larger than the first distance, and the second opening 31 is arranged above the another side of the first bottom wall 36. By the above structure, when excrement is discharged into the second accommodation space 311 of the fecal collection box 3 through the second opening 31, the excrement can slide along the inclined surface from the another side of the first bottom wall 36 to the one side of the first bottom wall 36, thereby preventing the excrement from stacking at the another side of the first bottom wall 36 under the second opening 31.

In this embodiment, the base 2 is provided thereon with a locking device 291, the locking device 291 is configured to lock the fecal collection box 3 detachably under the base 2. Among them, the locking device 291 is a locking elastic buckle. By the above structure, it is possible to detach the fecal collection box 3 by toggle the elastic buckle, it is convenient for users to remove excrement in the fecal collection box 3 and convenient for users to clean the fecal collection box 3.

In this embodiment, the first accommodation space 111 is provided therein with a plurality protruding frames 14. Among them, a cushion body 15 is further included, the cushion body 15 detachably covers the frames 14 and a bottom surface of the first accommodation space 111. By the above structure, the protruding frames 14 can support the cushion body 15, such that the cushion body 15 is higher than the bottom surface of the first accommodation space 111. Thus, it is possible to reduce volume of the first accommodation space 111 by placing pet sand on the cushion body 15, it is convenient for users to adjust use amount of pet sand; when required amount of pet sand is large, the cushion body 15 can be detached such that pet sand is directly placed on the bottom surface of the first accommodation space 111, thereby enlarging the volume of the first accommodation space 111.

In this embodiment, the cushion body 15 is connected with an inner wall of the roller 1 by buckle; wherein the cushion body 15 is provided thereon with a buckle part 151, the inner wall of the roller 1 is provided with a buckle fitting part 16, the buckle part 151 is detachably connected with the buckle fitting part 16. By the above structure, it can be convenient for users to assemble or detach the cushion body 15 in the first accommodation space 111.

Specifically, the first accommodation space 111 is provided therein with a protruding circular leak proof ring 1111, the circular leak proof ring 1111 is configured to block the excrement of pets in the first accommodation space 111. By the above structure, when the roller 1 rotates, the circular leak proof ring 1111 can prevent excrement, such as urine, in the first accommodation space 111 from leaking out of the first accommodation space 111.

In this embodiment, the support legs 6 are detachably connected to the base 2. Among them, the support legs 6 are connected to the base 2 by buckle. Specifically, the base 2 is provided with insertion openings 292, an inner wall of each insertion opening 292 is provided with a plurality of clamping gaps 293, and an outer side wall of each support leg 6 is provided with a plurality of buckles 61; when the support leg 6 is inserted in the insertion opening 292, the buckles 61 are connected with the clamping gaps 293, such that the support leg 6 and the base 2 are combined as a whole. Furthermore, a lower side of each buckle 61 is connected to the outer side wall of the support leg 6, and there is a slit 62 existing between the buckle 61 and the outer side wall of the support leg 6, the slit 62 is arranged to surround a top side, a left side, and a right side of the buckle 61. Furthermore, each insertion opening 292 is further provided with a first guide part 294, and each support leg 6 is further provided with a second guide part 63; when the support leg 6 is inserted into the insertion opening 292, the first guide part 294 slides along the second guide part 293, such that the buckles 61 are connected with the clamping gaps 293, and the support leg 6 and the base 2 are combined as a whole. Furthermore, the first guide part 294 is a guide block arranged on an inner side of the insertion opening 292, and the second guide part 63 is a guide groove arranged on a side wall of the support leg 6. By the above structure, it can be convenient for the support legs 6 to be mounted to or detached from the base 2. When it is required to support the base 2 by the support legs 6 and use the pet toilet, the guide groove is driven to slide along the guide block, such that the buckles 61 slide to clamping gaps 293 and connected to the clamping gaps 293, and the support legs 6 are mounted to the base 2. When it is required to retract and transport the pet toilet, it is possible to detach the buckles 61 from the clamping gaps 293 and detach the support legs 6, so as to reduce the volume of the pet toilet, thereby facilitating transporting and retracting the pet toilet.

In this embodiment, a casing 7, a control motherboard 71, and a power supply module 72 are further included. The control motherboard 71 is electrically connected with power supply module 72. The casing 7 has a fifth accommodation space 73, the fifth accommodation space 73 is formed by side walls of the casing 7, both the control motherboard 71 and the power supply module 72 are arranged in the casing 7. Among them, an interface group 74 is further included, the interface group 74 includes a plurality of interfaces. The casing 7 is provided thereon with a plurality of first mounting openings 75, the interface group 74 is electrically connected with the control motherboard 71 and the power supply module 72, the interface group 74 is arranged in the first mounting openings 75, and between the interface group 74 and an inner wall of each first mounting opening 75 there is provided with a sealing element 76. Specifically, an infrared detection device 77 is further included, the infrared detection device 77 is connected to the roller 1 or the base 2, and the infrared detection device 77 is configured to detect whether a pet enters the roller 1. Furthermore, a Hall sensing device 78 is further included, the Hall sensing device 78 has a position configured to detect rotation of the roller 1. Furthermore, the Hall sensing device 78 includes a magnet sensing area 781, a first magnet pole 782, and a second magnet pole 783; the magnet sensing area 781 is arranged on the first support arm 22 and/or the second support arm 23, and the first magnet pole 782 and the second magnet pole 783 are arranged on the roller 1. When the roller 1 rotates to the original position, the first magnet pole 782 is located in the magnet sensing area 781; and when the roller 1 rotates to the defecation position, the second magnet pole 783 is located in the magnet sensing area 781. Furthermore, the interface group 74 includes at least an infrared detection device interface 741, a Hall sensing device interface 742, and a power supply interface 743; the infrared detection device interface 741 is configured to be electrically connected with the infrared detection device 77, the Hall sensing device interface 742 is configured to be electrically connected with the Hall sensing device 78, and the power supply interface 743 is configured to supply power to the drive device 5. By the above structure, by the infrared detection device 77, it is possible to detect whether a pet enters the roller 1. When it is detected that a pet enters the roller 1, defecates, and leaves from the roller 1, the control motherboard 71 can control the roller 1 to rotate from the original position toward the defecation position according to feedback signals of the infrared detection device 77; when the magnet sensing area 781 senses the second magnet pole 783, the roller 1 rotates to the defecation position, the control motherboard 71 controls the roller 1 to stop rotating according to feedback signals of the Hall sensing device 78, such that excrement is discharged into the fecal collection box 3. After the excrement is discharged into the fecal collection box 3, the control motherboard 71 controls the roller 1 to rotate back from the defecation position towards the defecation device; when the magnet sensing area 781 senses the first magnet pole 782, the roller 1 rotates to the original position, the control motherboard 71 controls the roller 1 to stop rotating according to feedback signals of the Hall sensing device 78, such that the roller 1 is maintained at the original position for pets to enter, exit, and defecate. Furthermore, since both the power supply module 72 and the control motherboard 71 are located in the casing 7, and the casing 7 is provided thereon with the interface group 74 for the infrared detection device 77, the Hall sensing device 78, and the power supply module 72, modular design is implemented, and assembly among the power supply module 72, the control motherboard 71, the infrared detection device 77, the Hall sensing device 78, and the drive device 5 is facilitated. Moreover, since the sealing element 76 is arranged between the interface group 74 and the inner wall of each first mounting opening 75, liquid can be prevented from leaking into the casing 7, such that the power supply module 72 and the control motherboard 71 in the casing 7 are prevented from being corroded by liquid, and liquid is prevented from leaking into the casing 7 and causing short-circuit of the power supply module 72 and the control motherboard 71, the service life of the pet toilet is further improved.

In this embodiment, a middle part of the sieve component 12 recesses towards a direction facing the inner wall of the roller 1 to form a diversion channel 1211. By the above structure, it is convenient for excrement to be discharged into the fecal collection box 3 along the diversion channel 1211 and through the first opening 11 and the second opening 31.

Among them, the sieve component 12 includes a first part 122 and a second part 123, the first part 122 is connected to the roller 1, the second part 123 is connected to the first part 122, and the second part 123 is located between the first accommodation space 111 and the first part 122, the second part 123 is provided thereon with a plurality of sieve pores 1231. Specifically, a depth of the diversion channel 1211 gradually increases along a direction from the second part 123 to the first part 122, and a width of the diversion channel 1211 gradually decreases along the direction from the second part 123 to the first part 122. Furthermore, the first part 122 includes a first baffle 1221 and a second baffle 1222, one side of the first baffle 1221 is connected to the second part 123, a middle part of another side of the first baffle 1221 is connected to a middle part of the roller 1, two ends of the another side of the first baffle 1221 are connected to two ends of the roller 1 through the second baffle 1222, and the second baffle 1222 and the first baffle 1221 are arranged to form an acute angle, a right angle, or an obtuse angle. At the same time, the second baffle 1222 can further play a role of blocking pet sand to prevent pet sand from splashing into outside environment when the roller 1 rotates.

The above is one or more implementations provided in combination with specific content, and it is not considered that the specific implementation of the present disclosure is limited to these explanations. Any method, structure, and so on that is similar or identical to that of the present disclosure, or any technical deduction or replacement made under the premise of the concept of the present disclosure, shall be considered as the protection scope of the present disclosure.

What is claimed is:

1. A pet toilet comprising:
   a roller (1), wherein the roller (1) has a first opening (11) and a first accommodation space (111), the first opening (11) is in communication with the first accommodation space (111), and the first accommodation space (111) is configured to accommodate excrement of pets and pet sand;

a base (2), wherein the base (2) is configured to support the roller (1);

a fecal collection box (3), wherein the fecal collection box (3) is provided under the base (2), the fecal collection box (3) has a second accommodation space (311) and a second opening (31), the second opening (31) is in communication with the second accommodation space (311);

a sealing door (4), wherein the sealing door (4) is provided at the second opening (31);

a sieve component (12), wherein the sieve component (12) is connected to the roller (1), and the sieve component (12) and an inner wall of the roller (1) surround to form a third accommodation space (121), the third accommodation space (121) is adjacent to the first accommodation space (111), and the sieve component (12) is configured to sieve the pet sand and the excrement;

a drive device (5), wherein the drive device (5) is configured to drive the roller (10) to rotate on the base (2); when the first opening (11) rotates along with the roller (10) from an original position toward a defecation position, the pet sand is capable of entering the third accommodation space (121) through the sieve component (12), the excrement cannot enter the third accommodation space (121), and the drive device (5) drives the sealing door (4) to open the second opening (31), the first opening (11) rotates along with the roller (1) to be aligned with the second opening (31), such that the excrement is capable of being discharged by its own gravity into the second accommodation space (311) through the first opening (11) and the second opening (31); when the first opening (11) rotates along with the roller (1) from the defecation position toward the original position, the pet sand in the third accommodation (121) is capable of passing through the sieve component (12) and falling back into the first accommodation space (111) by its own gravity, and the sealing door (4) closes the second opening (31);

wherein the drive device (5) comprises a drive assembly (51) and a transmission device (52), wherein the drive device (5) is configured to drive the roller (1) to rotate on the base (2); when the first opening (11) rotates along with the roller (1) from the original position toward the defecation position, the roller (1), through the transmission device (52), drives the sealing door (4) to open the second opening (31), the first opening (11) rotates along with the roller (1) to be aligned with the second opening (31), such that the excrement is capable of being discharged by its own gravity into the second accommodation space (311) through the first opening (11) and the second opening (31); when the first opening (11) rotates along with the roller (1) from the defecation position toward the original position, the pet sand in the third accommodation (121) is capable of passing through the sieve component (12) and falling back into the first accommodation space (111) by its own gravity, and the roller (1), through the transmission device (52), drives the sealing door (4) to close the second opening (31);

wherein the drive assembly (51) comprises a drive motor (511), a driving gear (512), and a driven gear (513); the drive motor (511) has a drive shaft (514), the driving gear (512) is sheathed on the drive shaft (514), the driven gear (513) is arranged on the roller (1), and the driven gear (513) meshes with the driving gear (512) such that the drive shaft (514) rotates to drive the driving gear (512) to rotate, the driving gear (512) rotates to drive the driven gear (513) to rotate, and the driven gear (513) rotates to drive the roller (1) to rotate on the base (2); wherein one side of the base (2) is provided with a first support arm (22), another side of the base (2) is provided with a second support arm (23), each of the first support arm (22) and the second support arm (23) is provided with a support groove (24); both the two sides of the roller (1) have support shafts (13), the support shafts (13) are located in the support grooves (24), and each support groove (24) is provided therein with a plurality of first wheels (241), the first wheels (241) support the support shafts (13); and wherein below the support groove (24) there is further provided with a mounting groove (26), the mounting groove (26) is in communication with the support groove (24), the driving gear (512) is arranged in the mounting groove (26), an inner wall of the mounting groove (26) is provided with a fourth opening (261), and the mounting groove (26) is in communication with the outside through the fourth opening (261).

2. The pet toilet according to claim 1, wherein the transmission device (52) comprises a first transmission element (521) and a second transmission element (522), the first transmission element (521) is provided on an outer side wall of the roller (1), the second transmission element (522) is provided on the sealing door (4); when the first opening (11) rotates along with the roller (1) from the original position toward the defecation position, the first transmission element (521) is connected in transmission with the second transmission element (522), the roller (1), by rotation, drives the first transmission element (521) to rotate, the first transmission element (521) rotates to drive the second transmission element (522) to move, such that the sealing door (4) moves along with the second transmission element (522) until opening the second opening (31), and the first opening (11) rotates along with the roller (1) to be aligned with the second opening (31), such that the excrement is capable of being discharged by its own gravity into the second accommodation space (311) through the first opening (11) and the second opening (31); when the first opening (11) rotates along with the roller (1) from the defecation position toward the original position, the first transmission element (521) is connected in transmission with the second transmission element (522), the pet sand in the third accommodation (121) is capable of passing through the sieve component (12) and falling back into the first accommodation space (111) by its own gravity, and the first transmission element (521) rotates to drive the second transmission element (522) to move, such that the sealing door (4) moves along with the second transmission element (522) until closing the second opening (31).

3. The pet toilet according to claim 2, wherein the fecal collection box (3) is provided thereon with a sliding rail (3221), the roller (1), by rotation, drives the first transmission element (521) to rotate, the first transmission element (521) rotates to drive the second transmission element (522) to move, such that the sealing door (4) slides along with the second transmission element (522) on the sliding rail (3221) until opening or closing the second opening (31).

4. The pet toilet according to claim 3, wherein the first transmission element (521) is an first rack of an arc shape arranged along an outer circumferential wall of the roller (1), the sealing door (4) is a sealing door (4) of a plat and straight shape, the second transmission element (522) is a second rack of a plat and straight shape arranged on the sealing door (4), the sliding rail (3221) is a sliding rail (3221) of a plat and straight shape; the roller (1), by rotation, drives the first rack to rotate, such that the first rack drives the second rack to move, and the sealing door (4) slides along with the second rack on the sliding rail (3221) until opening or closing the second opening (31).

5. The pet toilet according to claim 3, wherein the first transmission element (521) is an first rack of an arc shape arranged along an outer circumferential wall of the roller (1), the sealing door (4) is a sealing door (4) of an arc shape, the second transmission element (522) is a second rack of an arc arranged on the sealing door (4), the sliding rail (3221) is a sliding rail (3221) of an arc shape; the roller (1), by rotation, drives the first rack to rotate, such that the first rack drives the second rack to move, and the sealing door (4) slides along with the second rack on the sliding rail (3221) until opening or closing the second opening (31).

6. The pet toilet according to claim 1, wherein the base (2) is further provided thereon with a third opening (21), the third opening (21) is located between the roller (1) and the second opening (31); when the first opening (11) rotates along with the roller (1) from the original position toward the defecation position, the pet sand is capable of entering the third accommodation space (121) through the sieve component (12), the excrement cannot enter the third accommodation space (121), and the sealing door (4) opens the second opening (31), the first opening (11) rotates along with the roller (1) to be aligned with the third opening (21) and the second opening (31), such that the excrement is capable of being discharged by its own gravity into the second accommodation space (311) through the first opening (11) and the second opening (31); when the first opening (11) rotates along with the roller (1) from the defecation position toward the original position, the first opening (11) and the second opening (31) are staggered with the third opening (21), the pet sand in the third accommodation (121) is capable of passing through the sieve component (12) and falling back into the first accommodation space (111) by its own gravity, and the sealing door (4) closes the second opening (31).

7. The pet toilet according to claim 1, wherein the base (2) further has a recessed portion (25) recessing toward a direction away from the roller (1); when the roller (1) is supported on the base (2), there is a gap between the roller (1) and an inner wall of the recessed portion (25), and the recessed portion (25) is provided thereon with a second wheel (251).

8. The pet toilet according to claim 6, the third opening (21) is arranged in the recessed portion (25).

9. The pet toilet according to claim 1, wherein the fecal collection box (3) has a first outer side wall (35) and a first bottom wall (36), the first bottom wall (36) is connected with the first outer side wall (35), when a distance between one side of the first bottom wall (36) and a bottom end of the first outer side wall (35) is defined as a first distance, and a distance between another side of the first bottom wall (36) and the bottom end of the first outer side wall (35) is defined as a second distance, the first distance is different from the second distance such that the first bottom wall (36) is arranged by an inclined angle.

10. The pet toilet according to claim 1, wherein the base (2) is provided thereon with a locking device (291), the locking device (291) is configured to lock the fecal collection box (3) detachably under the base (2).

11. The pet toilet according to claim 1, wherein the first accommodation space (111) is provided therein with a plurality protruding frames (14).

12. The pet toilet according to claim 11, further comprising a cushion body (15), wherein the cushion body (15) detachably covers the frames (14) and a bottom surface of the first accommodation space (111).

13. The pet toilet according to claim 12, wherein the cushion body (15) is connected with an inner wall of the roller (1) by buckle; the cushion body (15) is provided thereon with a buckle part (151), the inner wall of the roller (1) is provided with a buckle fitting part (16), the buckle part (151) is detachably connected with the buckle fitting part (16).

14. The pet toilet according to claim 1, wherein the first accommodation space (111) is provided therein with a protruding circular leak proof ring (1111), the circular leak proof ring (1111) is configured to block the excrement of pets in the first accommodation space (111).

* * * * *